US009665755B2

(12) United States Patent
Myers et al.

(10) Patent No.: US 9,665,755 B2
(45) Date of Patent: May 30, 2017

(54) SYSTEMS AND METHODS OF OBJECT DETECTION AND MANAGEMENT

(71) Applicants: Cory Myers, Ellicott City, MD (US); Tonika Myers, Ellicott City, MD (US)

(72) Inventors: Cory Myers, Ellicott City, MD (US); Tonika Myers, Ellicott City, MD (US)

(*) Notice: Subject to any disclaimer, the term of this patent is extended or adjusted under 35 U.S.C. 154(b) by 0 days.

(21) Appl. No.: 14/838,363

(22) Filed: Aug. 27, 2015

(65) Prior Publication Data

US 2016/0232387 A1    Aug. 11, 2016

Related U.S. Application Data

(60) Provisional application No. 62/042,782, filed on Aug. 27, 2014, provisional application No. 62/191,355, filed on Jul. 11, 2015.

(51) Int. Cl.
*G06F 19/00* (2011.01)
*G06K 7/10* (2006.01)
*G06Q 10/08* (2012.01)

(52) U.S. Cl.
CPC ..... *G06K 7/10415* (2013.01); *G06K 7/10297* (2013.01); *G06Q 10/087* (2013.01)

(58) Field of Classification Search
CPC ........... G06K 7/10297; G06K 7/10415; G06Q 10/087

USPC ................................................. 235/384, 385
See application file for complete search history.

(56) References Cited

U.S. PATENT DOCUMENTS

| | | | | |
|---|---|---|---|---|
| 6,919,803 B2* | 7/2005 | Breed | ................. | G06Q 20/203 340/426.19 |
| 8,068,023 B2* | 11/2011 | Dulin | ................. | B60P 3/03 340/539.11 |
| 8,659,420 B2* | 2/2014 | Salvat, Jr. | ............ | G01S 5/0027 235/384 |
| 2007/0164067 A1* | 7/2007 | Wright | ................. | A45F 5/00 224/401 |

* cited by examiner

*Primary Examiner* — Seung Lee

(57) ABSTRACT

Systems and devices for determining the presence of and managing objects contained within a container. The container includes at least one compartment that can house at least one object. In response to receiving a signal, the container is configured to transmit a signal regarding a determination of the presence of an object within a compartment. A first and second proximity sensor are used to cause a status check of the presence of an object within a compartment, such that the status check is initiated when the first and second proximity sensors are within a predetermined distance of each other. The determination of the presence of an object within a container may be transmitted to a connected wireless device. The connected wireless device may also remotely cause a status check of a compartment within a container.

13 Claims, 23 Drawing Sheets

Top View

501 Sync Button

502 Battery Compartment

SYSTEMS AND METHODS OF OBJECT DETECTION AND MANAGEMENT

FIELD OF INVENTION

The present invention relates to containers. More specifically, the present invention is directed to sensor and network technology associated with containers.

This application claims priority to U.S. App. Nos. 62/042,782 and 62/191,355.

BACKGROUND OF INVENTION

Conventional containers allow for storage of various items. For example, bags allow parents of children to efficiently carry all items associated with children. These items can include bottles, formula, diapers, medicines, etc. Many bags are not compartmentalized. Thus, all contents within the bag are mixed. This bag configuration has a disadvantage to users in that specific items are not easily found amongst the combined items within the bag. Additionally, the mixing of items could negatively impact an individual product. For example, liquid medicines can spill within the bag, and thus ruin other items within the bag.

Parents and/or guardians of children are frequently under pressure to remember all items needed for their child or children. When going outside of the home, parents and/or guardians of children may find useful to have handy items such as bottles, formula, diapers, medicines, etc. in a centralized location—such as a baby bag. Due to parental pressures and time constraints, important items are frequently forgotten by parents and/or guardians when leaving their home. For example, a baby bag is generally stocked with a number of pampers to be used with their children. A disadvantage to conventional bags is that parents are not reminded as supplies of pampers or other items dwindle over the course of multiple trips. This can result in parents and/or guardians having to inconveniently purchase items—frequently at high costs. Additionally, this scenario has the disadvantage of having the child have to uncomfortably endure lengthy periods of time without the missing item. For example, a child may have to wear a soiled diaper for a prolonged period of time if a parent discovers that a pamper supply has dwindled to nothing.

Accordingly, it would be advantageous to have a bag or container to alert a user of items missing from the bag at a time and location that will allow the user to add or replenish the missing item.

SUMMARY OF THE INVENTION

Device for detection and management of objects contained within a container is described.

According to an exemplary aspect of the invention, a device having at least one compartment to contain at least one object is provided. The device comprises a transceiver that is configured to receive a signal that causes a determination of the presence of at least one object with the at least one compartment. The transceiver is further configured to transmit the determination of the presence of at least one object within the at least one compartment.

According to an exemplary aspect of the invention, a system having a container with at least one compartment is provided. The system comprises at least one sensor configured to determine the whether at least one object is present within the at least one compartment. The system further comprises a first proximity sensor and a second proximity sensor that is configured to cause the at least one sensor to determine the presence of at least one object within the at least one container. The system is further configured to transmit a signal regarding the determination of the presence of at least one object within the at least one compartment.

According to an exemplary aspect of the invention, a container having at least one compartment is provided. The compartment comprises at least one opening, a mechanism, a processor and a gps module. The gps module is adapted to cause mechanism to determine the presence of an object within the container.

DETAILED DESCRIPTION

Figure 1:
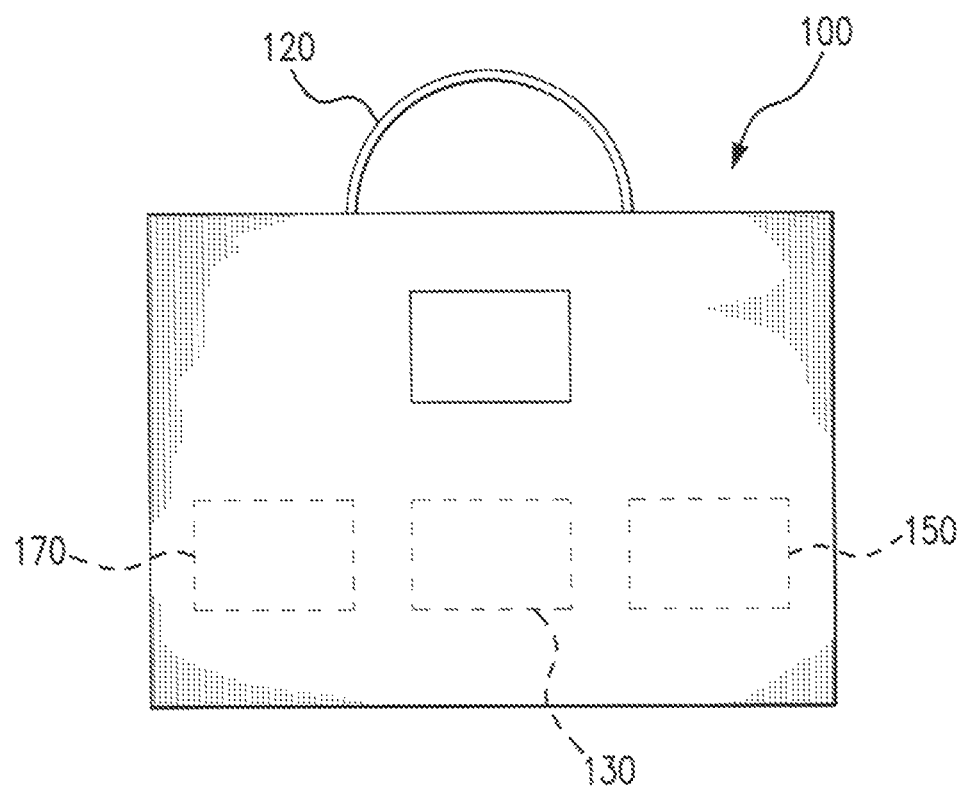
FIG. 1 is an exterior view of a container according to an embodiment of the present invention.

FIG. 1 shows the exterior of a bag. Container 100 is generally comprised of body 110 and straps 120. Body 110 is the section that houses the contents of the bag. The body 110 can be opaque in nature, which allows the user to maintain privacy of the bag's contents. However, the exterior of the bag may be translucent in nature, which will allow the contents of the bag to be seen. Straps 120 allow the user to grip and/or carry the bag. For example, the user could carry the bag on his/her shoulder using straps 120. Additionally, the straps 120 can be used as a scale to determine the weight of the container 100. Display panel 160 is affixed to the bag in order to display information about the container 100, or the contents therein. Notably, the display panel is connected to sensors located about container 100, and may be affixed to the interior or exterior of container 100. Alternatively, the display can be designed to be positioned inside or outside of container 100.

Container 100 may include multiple sensors designed to provide information about the bag, or the contents therein. For example, container 100 includes a global positioning system (GPS) sensor 130 to provide location information for the bag. The GPS sensor 130 is designed to interact with prepositioned satellite system that can transmit or receive information from the sensor to determine the location of the bag. Additionally, GPS sensor 130 could also interact with transceiver components located within a building, or otherwise, to determine precise location of container 100. Location information can be provided directly from GPS sensor 130. Alternatively, a separate proximity sensor 150 can be installed within container 100. Proximity sensor 150 could receive and transmit data to a transceiver device that is pre-positioned by a user. For example, a user could locate multiple transceiver within various rooms within a building to determine relative distance of the container 100 from the pre-positioned transceiver. Advantageously, this system allows a user to locate a container when misplaced. Container 100 also contains central processing unit 170, which is electronically connected to display 160, GPS sensor 130, proximity sensor 150, and any other sensor or electronically enabled equipment. Central management unit (CMU) 170 is designed to receive information from and transmit information to any device that is electronically connected to it. A central management unit may comprise a central processing unit and a computer memory storage unit.

Figure 3:
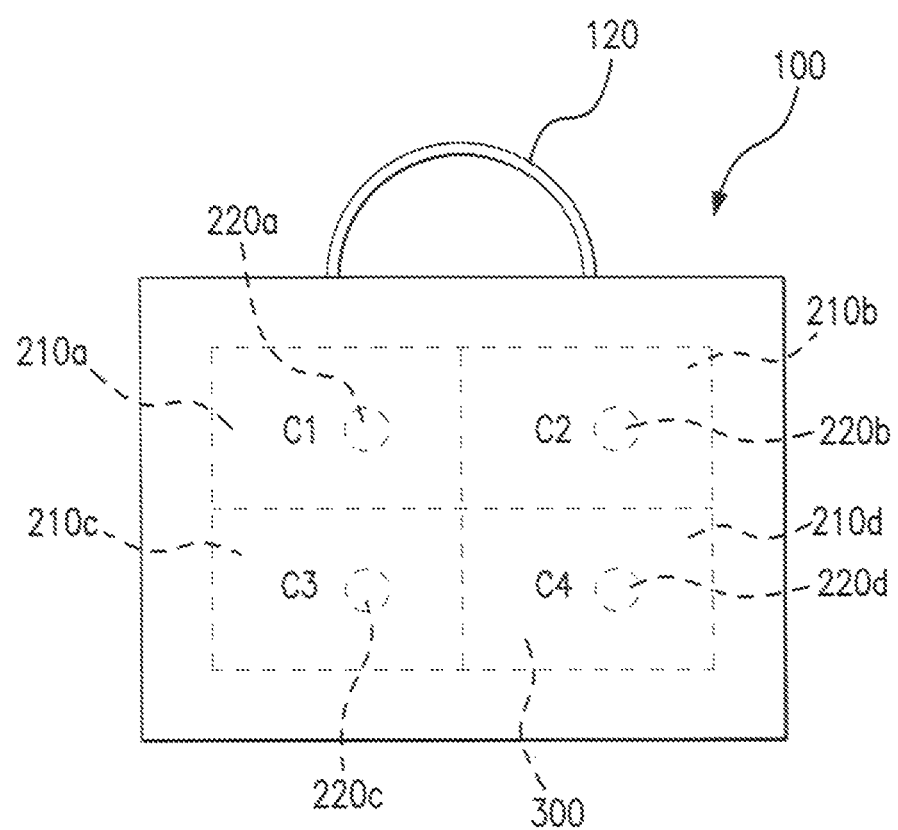
FIG. 3 is an alternative embodiment depicting a compartment insert within a container.

Interior section 200 is shown within the interior of container 100. Interior section 200 may be comprised of multiple compartments designed to house objects. As shown, compartments 210a, 210b, 210c, and 210d are designed to contain distinct or similar objects within each. Compartments 210a, 210b, 210c, and 210d are completely sealed from each other. Accordingly, the contents of each compartment are not able to commingle with the contents of a different compartment. Notably, the interior section 200 can be comprised of a translucent material that will allow the contents of each of the compartments to be visually observed. However, the interior section may be comprised of an opaque material. As shown in FIG. 3, the interior section may able comprised of a separate/external compartment insert 300 that can be placed within container 100. Each compartment 210a, 210b, 210c, and 210d include, respectively, sensors 220a, 220b, 220c, and 220d. Each of the sensors (220a, 220b, 220c, and 220d) is designed to independently determine information about the contents of its associated compartment. For example, sensors 220a and 220d could determine that there are objects within compartments 210a and 210d. However, sensors 220b and 220c could determine that there are no objects within compartment 210b and 210c. Sensors 220a, 220b, 220c, and 220d are each connected to CM U 170. Accordingly, each of the sensors can deliver information regarding the status of compartments 210a, 210b, 210c, and 210d. Furthermore, CMU 170 can transmit information to sensors 220a, 220b, 220c, or 220d. For example, CMU 170 can query sensors 220a only to determine if an object exists within compartment 210a. Alternatively, CMU 170 could send a signal to each of the sensors to determine if objects exists within compartments 210a, 210b, 220c, and 220d. In response to the query, sensors 220a, 220b, 220c, and 220d sends information to CMU 170, which can then be relayed to display 160.

In addition to detecting the presence of an object within a compartment, the sensors can be configured to relay additional information. For example, sensors 220a, 220b, 220c, and 220d can be configured to indicate the relative quantity of objects within a compartment. Various technologies can be employed in the function of the sensors. In exemplary embodiments, sensors 220a, 220b, 220c, and 220d employ sensing technologies such as light, radio frequency identification (RFID), infrared, weight, magnetic interaction, induction, etc. However, one of ordinary skill in the art would recognize that sensors 220a, 220b, 220c, and 220d can employ any technology that can be configured to determine the status of compartments 210a, 210b, 210c, and 210d. For example, sensors 220a, 220b, 220c, and 220d can consist of multiple magnets being situated across from each other within each compartment 210a, 210b, 210c, and 210d. Based on the relative distance of the magnets located across from each other within a compartment, CMU 170 can make a determination of the relative quantity of items within a compartment. The quantity determination can be shown on display 160 or otherwise relayed to a user to indicate that a restocking of objects within compartments 210a, 210b, 210c, or 210d is required. For example, this could be particularly useful if the objects in one of the compartments are baby items such as pampers. In an embodiment where sensors 220a, 220b, 220c, or 220d are utilizing magnetic sensors, a distance decrease between the magnets within a single compartment could indicate that the stock of pampers is running low, or has been fully depleted. This can beneficially inform the user to re-stock the pamper compartment prior to full depletion.

Figure 4:
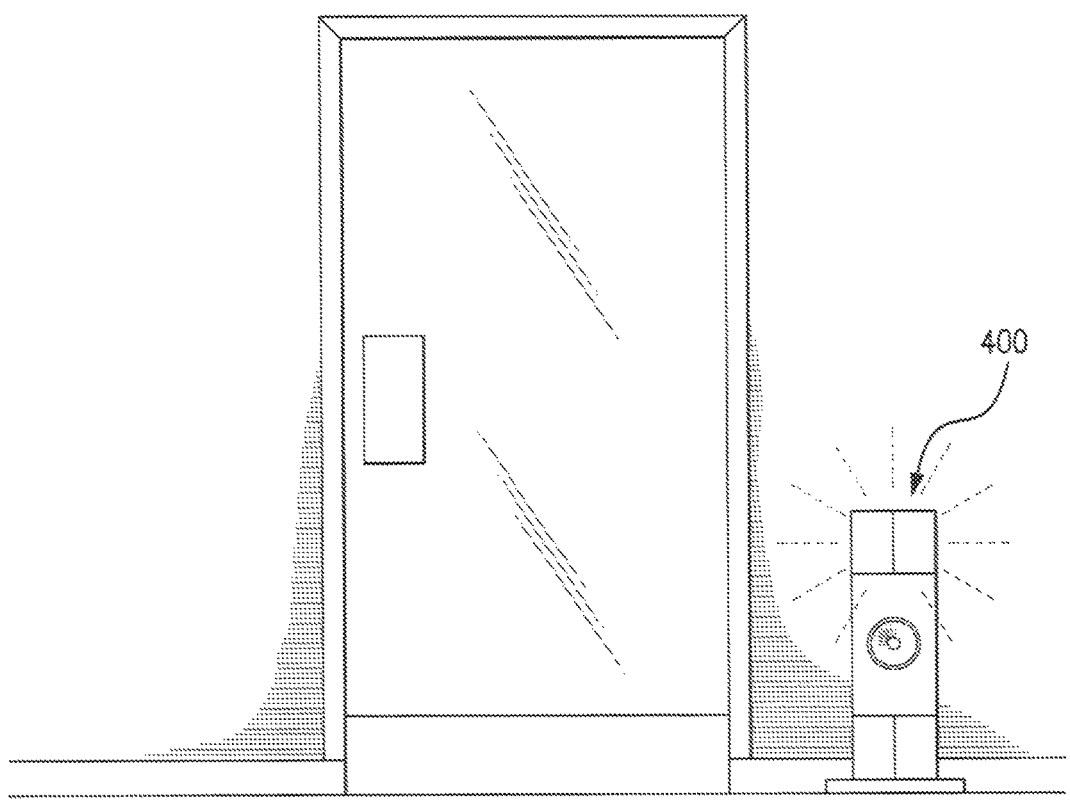
FIG. 4 is an embodiment of an external proximity sensor.
Figure 5A:
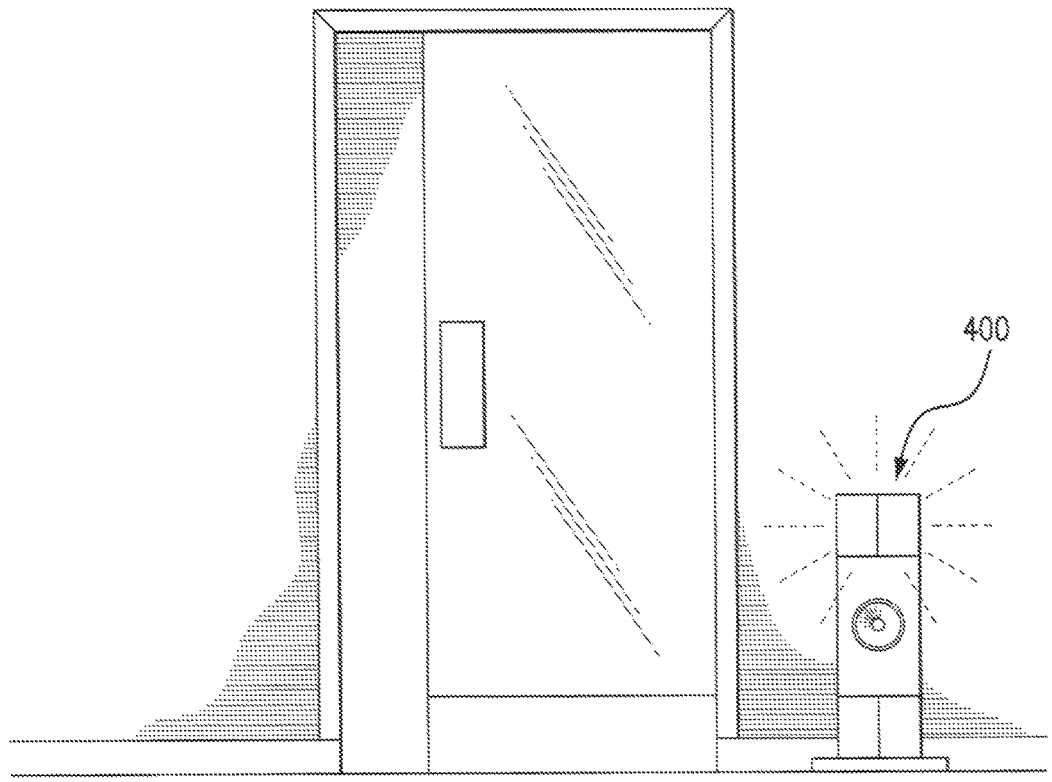
FIG. 5A is a view of the interaction of a container and the external proximity sensor according to an embodiment of the present invention.
Figure 5A:
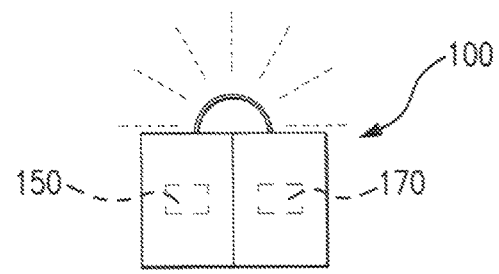

FIGS. 4 and 5A depict proximity sensor 400, which is designed to cause a query of the status of container 100 at a predetermined location. As shown, proximity sensor 400 is located near a door such that a user can be reminded of the status of any compartment prior to leaving a location. However, proximity sensor 400 is designed to be portable enough such that a user could locate the device at any location of their choice. When container 100 comes within the proximity of proximity sensor 400, CMU 170 will cause a query of sensors 220a-d. If the contents of compartment 210a, 210b, 210c, or 210d are low or depleted, the query of sensors 220a-d and subsequent relay of information to the user, e.g., via display 160, would remind user to replenish the identified compartment upon leaving or entering a premises. Proximity sensor 400 and CMU 170 will at least one of the following wireless communication technologies: 802.11, CDMA, GSM, Bluetooth, Near Field Communication, RFID sensor, etc. To the extent that RFID technology is employed by proximity sensor 400, an accompanying RFID sensor installed within container 100. When container 100 is sensed by proximity sensor 400, proximity sensor 150 sends a signal to CMU 170 to check status of compartments 210*a-d*. Sensors 220*a-d*, subsequently transfers the results of the query of each compartment back to CPS 170. CPS 170 packages the results and forwards to proximity sensor 150, which transmits this data in response to the query by proximity sensor 400. It should be understood that any wireless communication can be employed for communication between container 100 and proximity sensor 400.

Figure 5B:
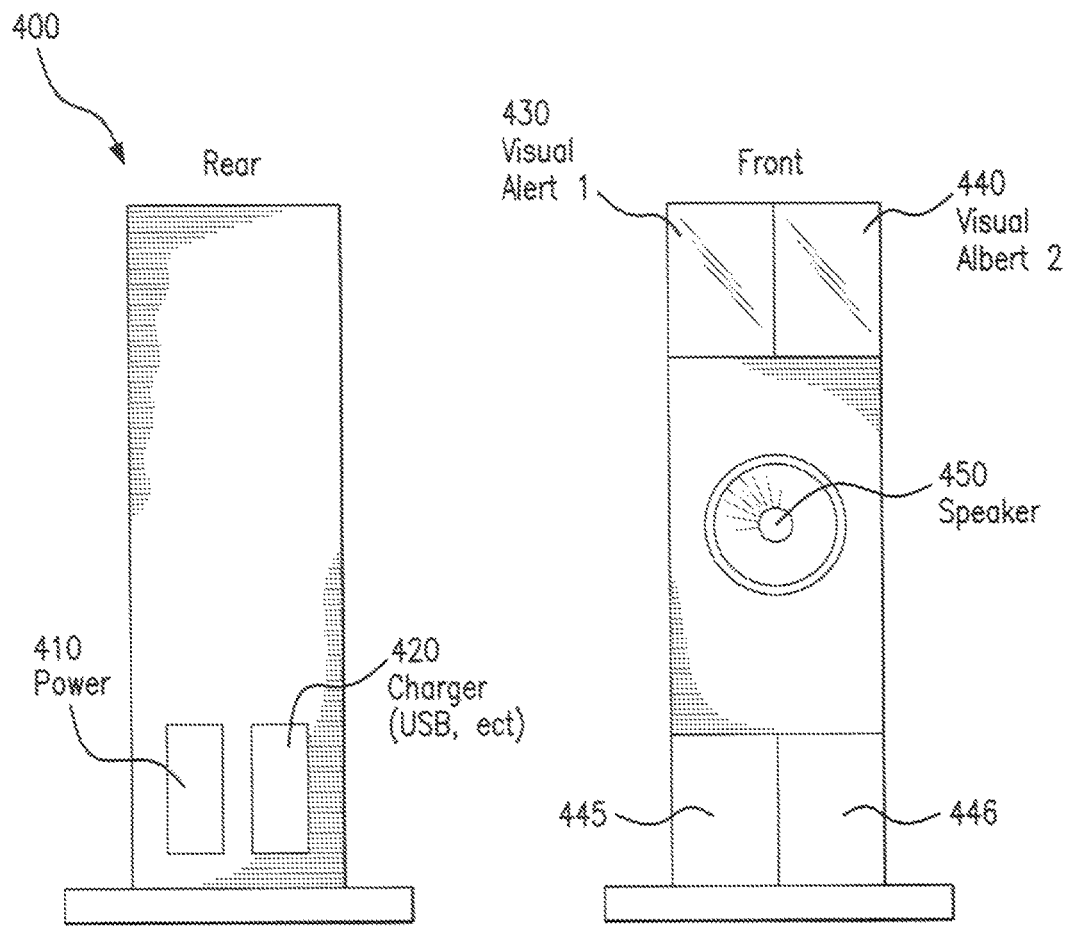
FIG. 5B is an external view of the external proximity sensor.

FIG. 5B depicts the rear and front view of proximity sensor 400. For example, power terminal 410 is located on the rear portion of proximity sensor 400. This allows proximity sensor to be powered via a standard electrical outlet. Also, if proximity sensor 400 is equipped with rechargeable batteries, those batteries may be recharged when power terminal is connected to a standard electrical outlet. Additionally, a separate charging port 420 is supplied on the rear of proximity sensor 400. Charging port 420 can be used to charge other electronic products with rechargeable batteries. For example, proximity sensor 400 via charging port 420 could be electrically connected to container 100 when its electrical energy source has been depleted.

The front portion of proximity sensor 400 is also depicted by FIG. 5B. In exemplary embodiments, there are at least two visual indicators, 430 and 440 provided on the front portion of proximity sensor 400. Visual indicator 430 is a flashing LED light that is activated if container 100 is within range of proximity sensor 400 and an associated mobile device (i.e., cellphone, tablet, etc.) is not detected. Visual indicator 440 is a separate flashing LED light that is activated if container 100 a mobile device (associated with container 100) is within range of proximity sensor 400 and container 100 is not detected. In an alternative embodiment, visual indicators 445 and/or 446 are provided such that separate LED lights are invoked if CMU 170 transmits a signal that either of the compartments 210*a-d* has a low or depleted status. Or, visual indicator 446 could be invoked if proximity sensor 400 determines that a person has come within its range; however, container 100 and an associated mobile device is not detected. For distinguishing purposes, differing LED light colors can be used for each visual indicator. Additionally, proximity sensor 400 includes speaker 450, which is provided such that audible alerts can be given if any of the statuses associated with visual indicators 430, 440, 445, and 446 is detected. Differing beeps (or other sounds) may be associated for each status. However, in an alternative embodiment, speaker 450 may provide a speech message explicitly indicating a particular status.

Figure 5C:
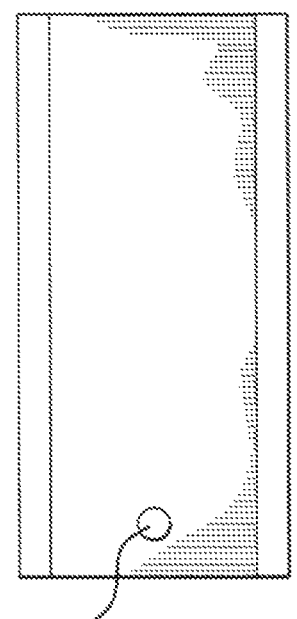
FIG. 5C is an alternative external view of the external proximity sensor.
Figure 5C:
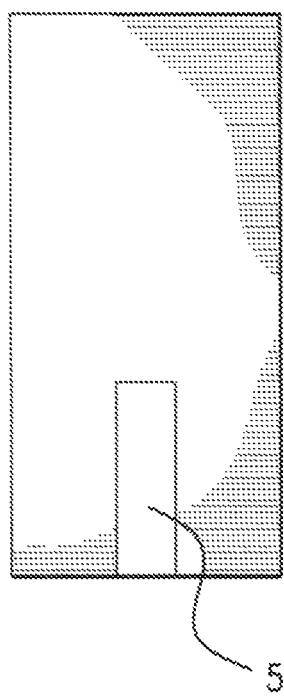

FIG. 5C shows a top and bottom view of proximity sensor 400. For example, synchronization button 501 allows container 100 to be sensed and synchronized with proximity sensor 400. It should be understood that multiple containers may be synchronized with proximity sensor 400. On the bottom portion of proximity sensor 400 is battery compartment door 502. Battery compartment door 502 allows batteries (standard or rechargeable) to be placed within proximity sensor 400. To the extent that rechargeable batteries are used within container 100, those batteries may be recharged by electrically connecting proximity sensor 400 via power port 410 to a standard electrical port.

Figure 6:
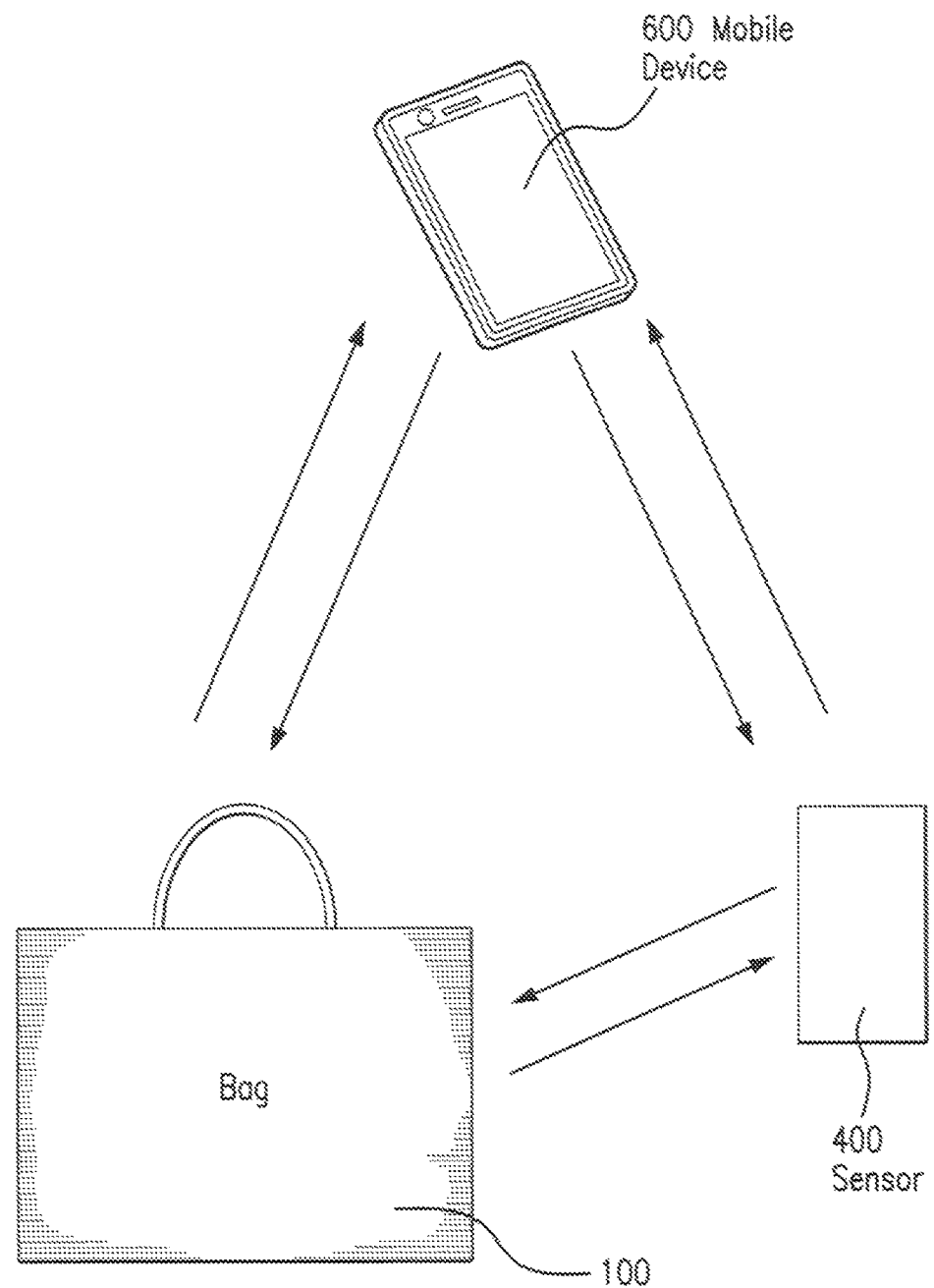
FIG. 6 is a view of communication between a container, an external proximity sensor, and a mobile device.

FIG. 6 demonstrates the interaction between container 100, proximity sensor 400, and an associated wireless device. For example, as container 100 comes within range of proximity sensor 400, container 100, via CMU 170, will send a wireless signal to inform proximity sensor 400 that it is within its proximate range. The proximity sensor 400 will transmit a wireless signal to CMU 170 of container 100, which causes the status of each compartment 210*a-d* to be determined. Once the statuses of each compartment is determined, CMU 170 data regarding the statuses of compartments 210*a-d*. Additionally, CMU 170 could transmit signals regarding the general statuses of container 100. For example, data regarding the battery life of the battery powering the electronic components of container 100.

Simultaneous to the interaction between container 100 and proximity sensor 400, an electronic signal is wireless transmitted to wireless device 600. In the event that either of compartments 210*a-d* is determined to include objects with a low or depleted quantity, a wireless signal is transmitted to an associated wireless device to alert the user. This beneficially allows the user to re-stock the particular compartment prior to leaving a location where the user has placed proximity sensor 400. It should be understood that data transmission regarding a low or depleted status of objects is not the only data transmitted, but all data regarding container 100 can be transmitted to wireless device 600. Furthermore, as wireless device 600 comes within close range of proximity sensor 400, an electronic signal is sent from the wireless device 600 to proximity sensor 400. Upon receiving this signal, proximity sensor 400 does not illuminate visual sensor 430, 440, 445, and 450. However, if proximity sensor 400 does not detect wireless device 600 when container 100 is within close range of proximity sensor 400, one of visual indicators 430, 440, 445 and 450 will be illuminated informing the user that wireless device is not present. This beneficially allows a user to ensure that wireless device 600 is not inadvertently forgotten.

Figure 7A:
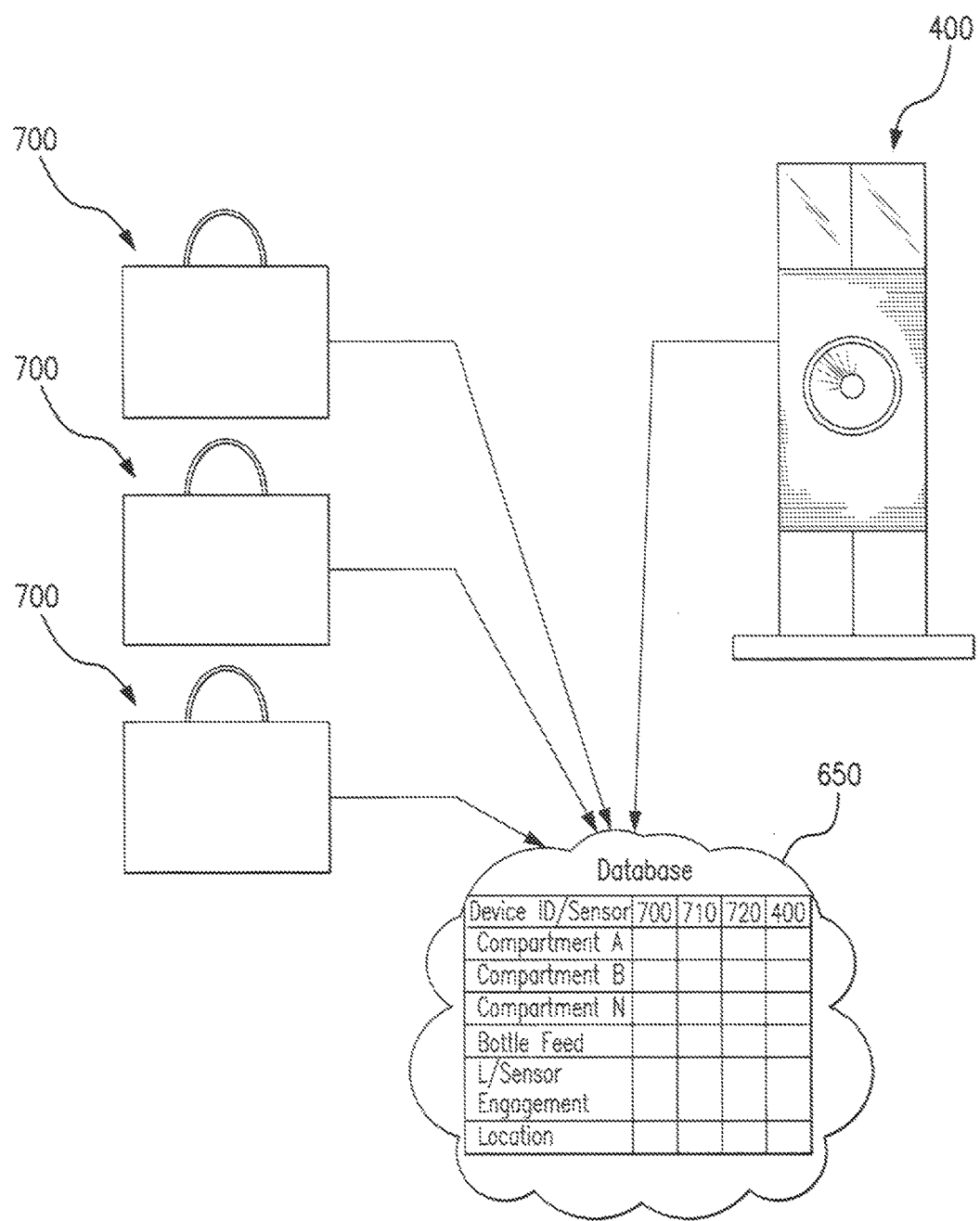
FIG. 7A is an alternative embodiment of the present invention depicting the communication of a plurality of containers, an external proximity sensor, and a cloud based database.
Figure 7B:
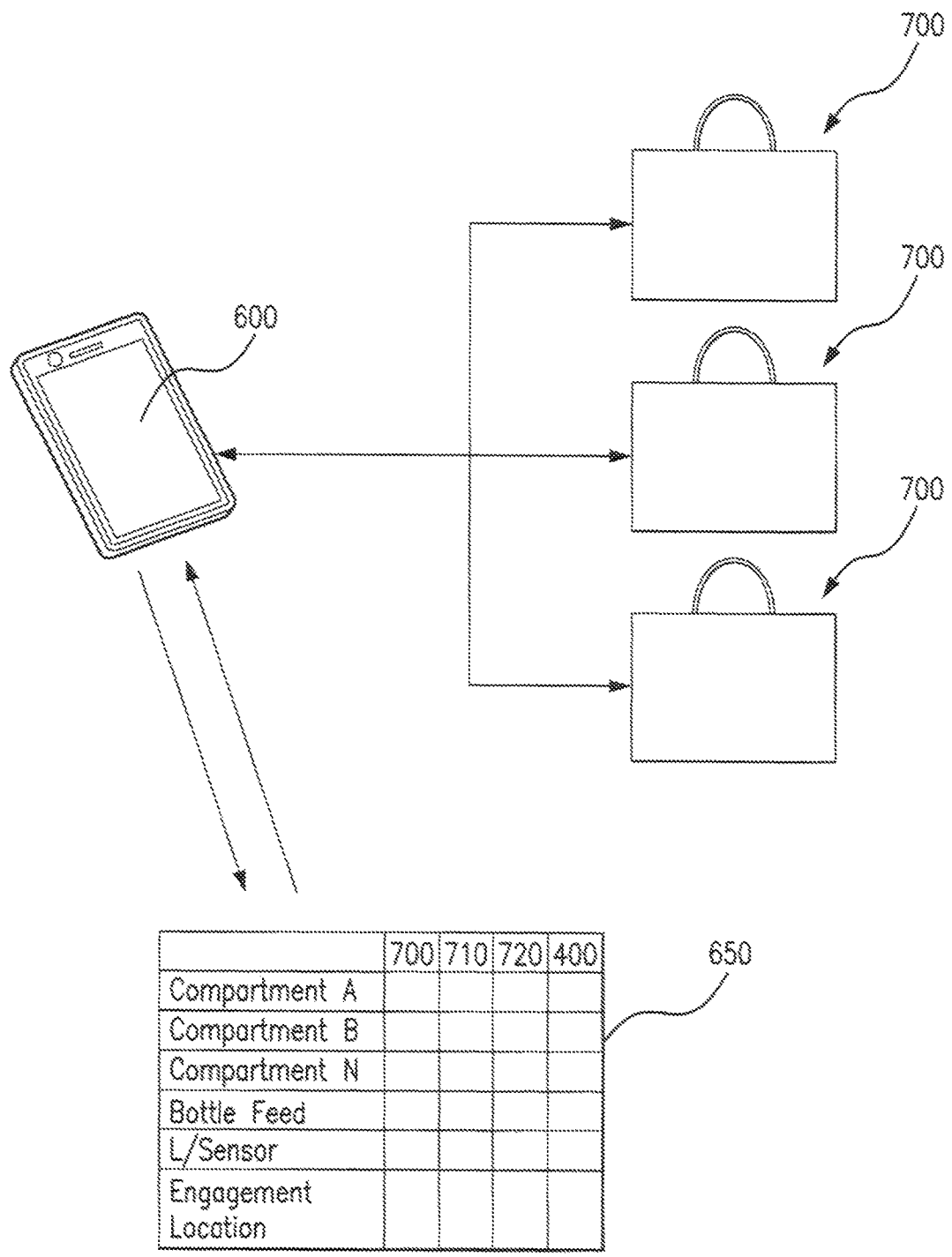
FIG. 7B is an alternative embodiment of the present invention depicting the communication of a plurality of containers, a mobile device, and a cloud based database.

FIG. 7 shows an alternative embodiment of system, wherein multiple containers are processed by a single proximity sensor 400. As shown, proximity sensor 400 is configured to sense containers 700, 710, and 720. Although three containers are shown to be wirelessly linked to proximity sensor 400, it should be understood that a proximity sensor can process one or more containers. Proximity sensor 400, will also be able to automatically detect new containers that come within its range. For example, proximity sensor 400 will be configured to detect a CMU located within a container. When this occurs, an authentication scheme prompting the user to identify the newly detected container can be displayed on a display located within a container. Alternatively, the authentication process can occur at the request of a user via an associated wireless device or generally through an associated online authentication process. This allows a user to purchase multiple containers without the necessity of purchasing new proximity sensor for each new container.

As either of containers 700, 710, and/or 720 comes within range of proximity sensor 400, a wireless signal will be transmitted to each of the containers from the sensor, causing a status check of each container to occur. As discussed herein, the results of the status check of each container will be transmitted back to proximity sensor 400, wherein an audio or visual alert will be given in relation to a low or depleted status of a particular compartment. Additionally, proximity sensor 400 may transmit data to a remotely located database 650. Database 650 is configured to store data that can be associated with each of the devices within the system: containers 700, 710, and 720, and proximity sensor 400. The status information associated with each device may include, but is not limited to, status of each compartment within a container, battery level, time of last interaction with an associated proximity sensor, and location information. Alternatively, each container may directly transmit data directly to remote database 650. Direct transmission from containers 700, 710, or 720 would require each container to have its own independent wireless communication capability, e.g., cellular communication, Wi-Fi, Bluetooth, etc.

As shown in FIG. 7A, database 650 may also be electronically connected to wireless device 600. For example, wireless device 600 may initiate a query of database 650 by sending an electronic signal via an appropriate communication protocol, e.g., cellular communication, Wi-Fi_____33, Bluetooth, etc. Wireless device 600 may query database 650 to determine the contents and quantity of objects within containers 700, 710, or 720. This feature may be particularly useful when a user does not have access to a container, but wishes to know the whereabouts or status of the contents within a container. In an exemplary, non-limiting embodiment, a parent who owns a container may enter a retail store without having container 700. The parent, utilizing his or her wireless device 600, may query database 650 to determine if a particular item should be purchased, e.g., compartment A or container 700 is low or depleted in pampers. The parent can advantageously purchase pampers while in the retail store without having to physically retrieve the container and search its contents.

Additionally, wireless device may communicate directly with either of containers 700, 710, or 720. This allows the container to be in contact with the wireless device in order to determine that a container may have been left behind. For example, if a direct connection is not established between wireless device 600 and either of containers 700, 710, or 720, this could be an indication that container may have been left behind, e.g., at a restaurant. Wireless device 600 may also directly query the container to determine its contents. Also, containers 700, 710, or 720 may directly send data to wireless device regarding its contents. In an alternative embodiment, a user may have the ability to send a text message to a wireless device utilizing the display panel 160.

Figure 8A:
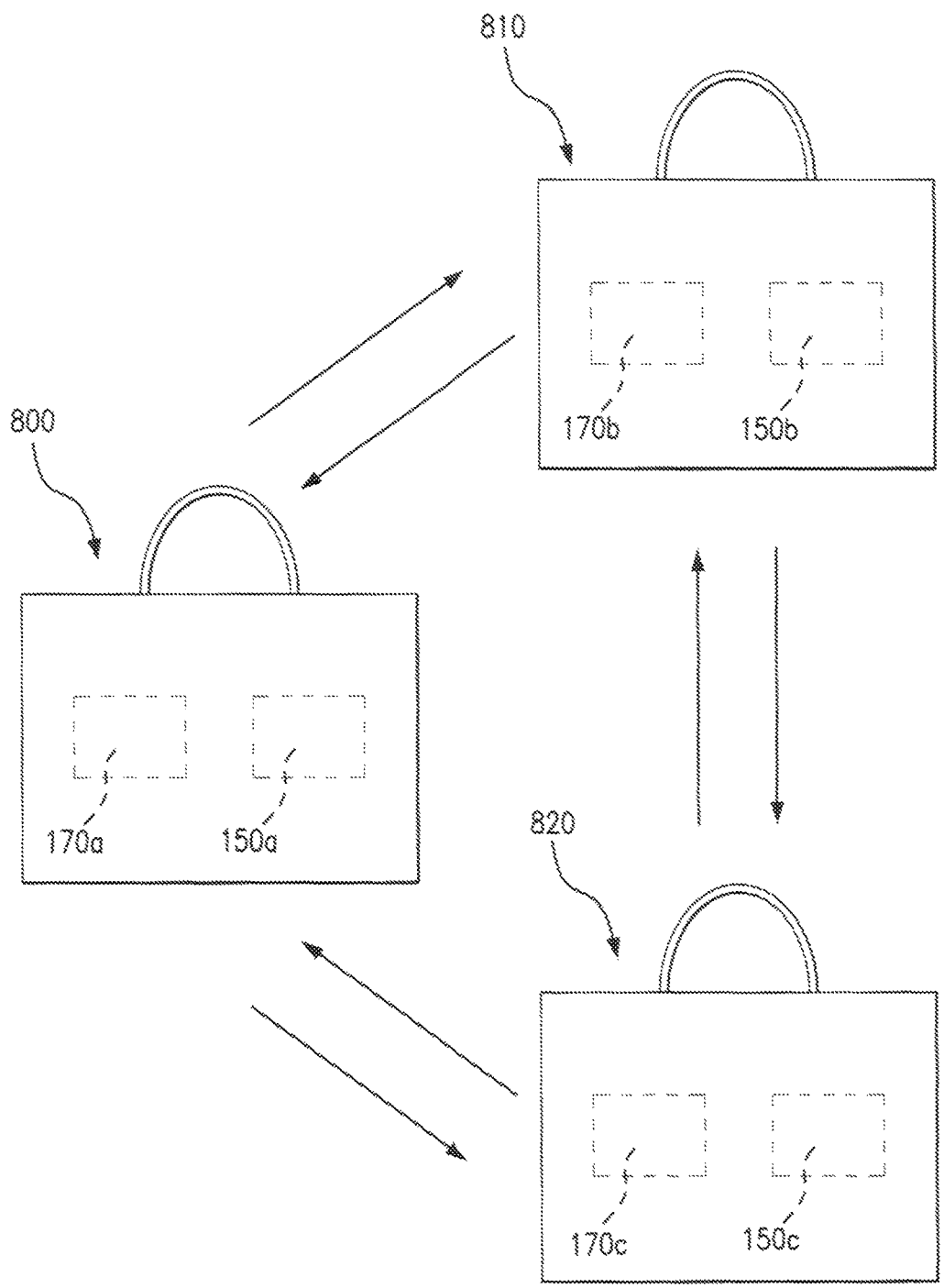
FIGS. 8A and 8B are alternative embodiments of the present invention depicting communication between a plurality of containers.

FIG. 8A depicts multiple containers 800, 810, and 820 that each have the ability to communicate with the other. For example, proximity sensors 150a, 150b, and 150c may be configured to sense the other when within a pre-determined distance of the other. The pre-determined distance could be within five feet of another container, or less. When proximity sensor 150a senses either sensor 150b or 150c, CMU 170a creates a database entry for each of the sensed container. Additionally, CMU 170a transmits a signal to CMU 170b and CMU 170c causing a status check of the compartments within container 810 and 820. CMU 170b and CMU 170c transmit individual signals to CMU 170a identifying the results of the status check.

Figure 8B:
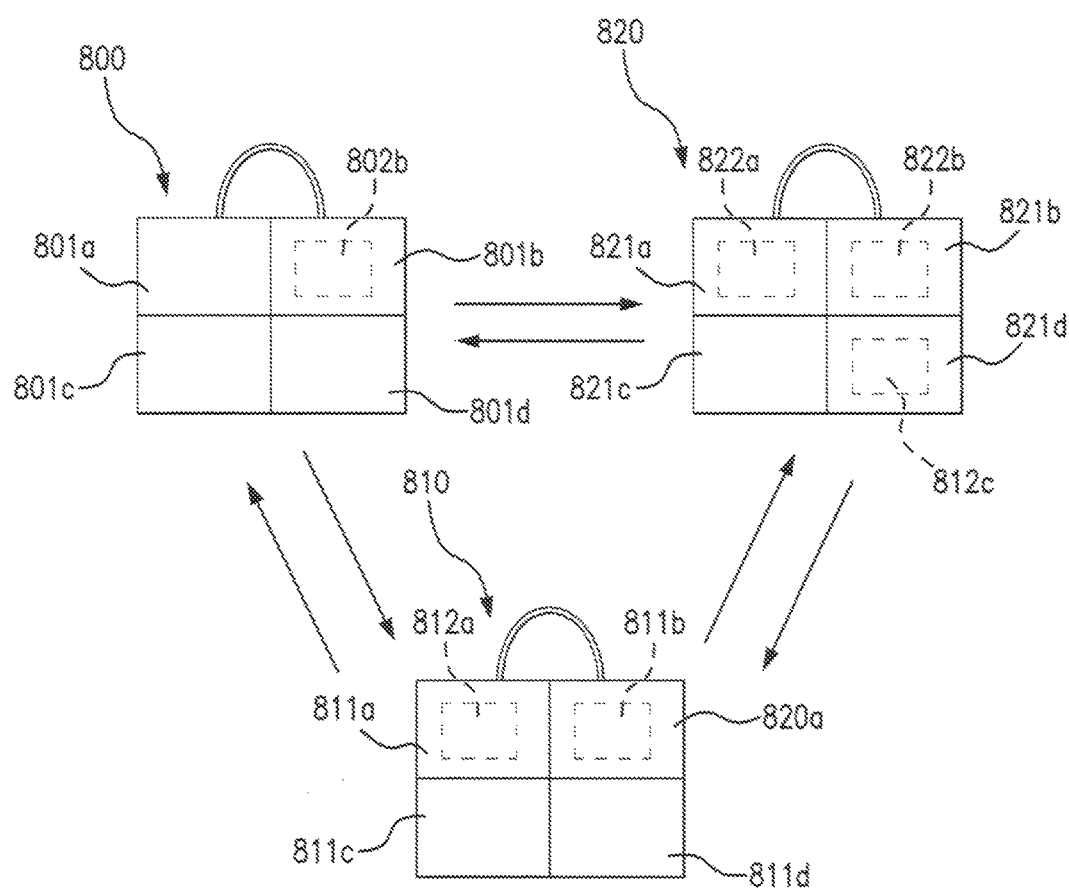

To further illustrate the communication between containers 800, 810, and 820, FIG. 8B details the interaction of the various compartments within each container. As shown in the previous embodiments, each container comprises multiple compartments. When proximity sensors 150a senses sensors 150b or 150c, it causes CMU 170a, 170b, and 170c to determine the contents of each compartment, e.g., 801a-801d, 821a-821d, or 811a-811d. Each CMU can also determine which objects are associated with a specific container. For example, objects 802a and 802b are associated with container 800. Data regarding the associated objects of each container is stored in the data storage section of each CMU. Accordingly, the status inquiry of containers 800, 810, and 820 would determine that object 802a is inappropriately located within container 810. Additionally, a status inquiry would determine that object 812c, which is associated with container 810—compartment 811c, is inappropriately located in container 820—compartment 821d. Furthermore, it should be understood, that a status inquiry could also be initiated from a mobile device associated with either of the containers.

Advantageously, this alternative embodiment allows users of the systems to quickly find objects that are temporarily misplaced. For example, at a team sporting event where there are multiple items such as gloves, bats, balls, shoes, etc. that each player individually carries, an embodiment of the present invention will allow for the rapid identification of such items. If, for example, Player 1's baseball glove is mistakenly placed in Player 2's bag, this will allow for Player 1 or Player 2 to locate and return the baseball glove before leaving the sporting facility. Additionally, a coach or parent could also determine the location of a missing item by causing a status inquiry via an application on their mobile device of Player 1's and Player 2's bag if an item is determined to be missing. In this embodiment an RFID tag could be affiliated with an item and a CMU of a particular bag. Embodiments of the present invention contemplate such an RFID tag being embedded within an item or externally placed on a particular item. In this scenario, specific containers or bags would be affiliated with a particular group of users. Therefore, a coach or parent could cause a status inquiry of only an affiliated user group, i.e., a specific team.

Additionally, an alternative embodiment of the present invention contemplates scenarios where multiple containers can be affiliated with an individual user. In this scenario, an object can be affiliated with a particular container. For example, a CMU within a container could store identification information regarding an object affiliated with the container. The identification information could be transmitted to the CMU of a container via an RFID tag or other identification device associated with an object. Accordingly, a user could keep track and manage various objects within various compartments within various containers such that objects can be replenished when necessary. In an exemplary a scenario, a user container, e.g., a baby bag with multiple compartments, could sense that the compartment associated with a bottle is empty or unusable. The baby bag could query other connected containers, e.g., other baby bag or a refrigerator, to determine if there is an identified baby bottle (that is currently identified with the other baby bag or a refrigerator) within any of other connected containers. Beneficially, this allows a user to identify a locally held supply of pampers and replenish the first baby bag while convenient to do so.

Figure 2:
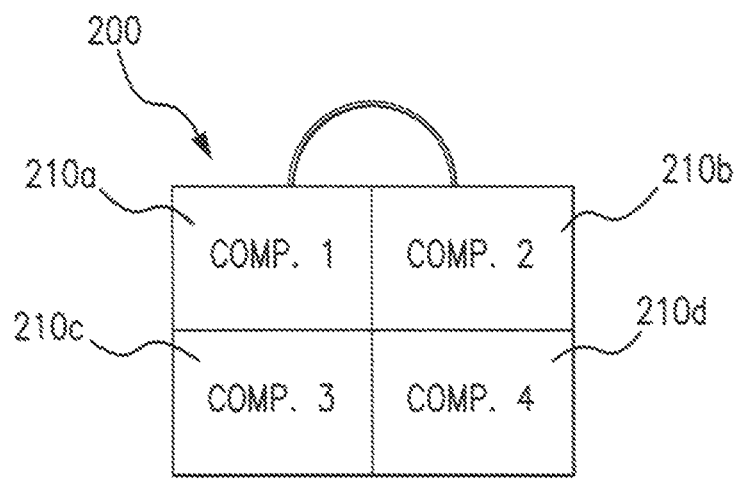
FIG. 2 is a cross sectional view of a container according to an embodiment of the present invention.
Figure 2:
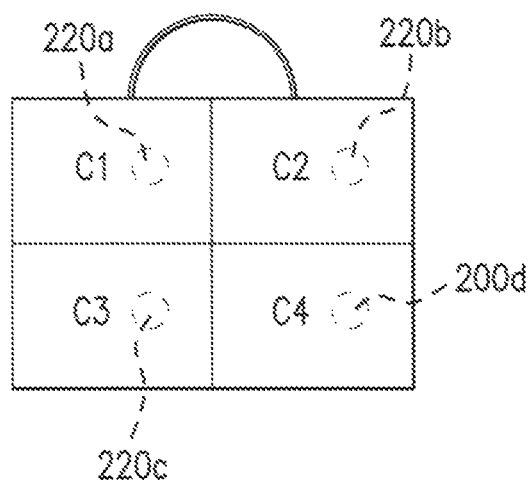
Figure 9:
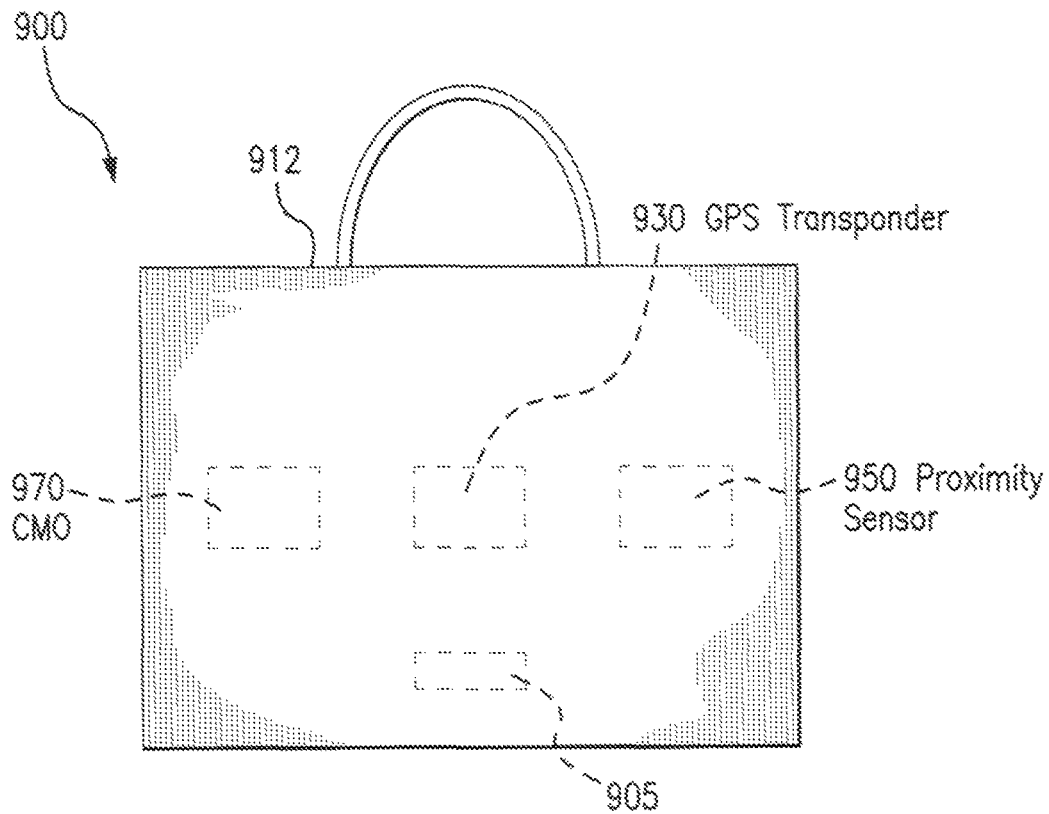
FIG. 9 is an exterior view of a compartment insert according to an embodiment of the present invention.
Figure 9:
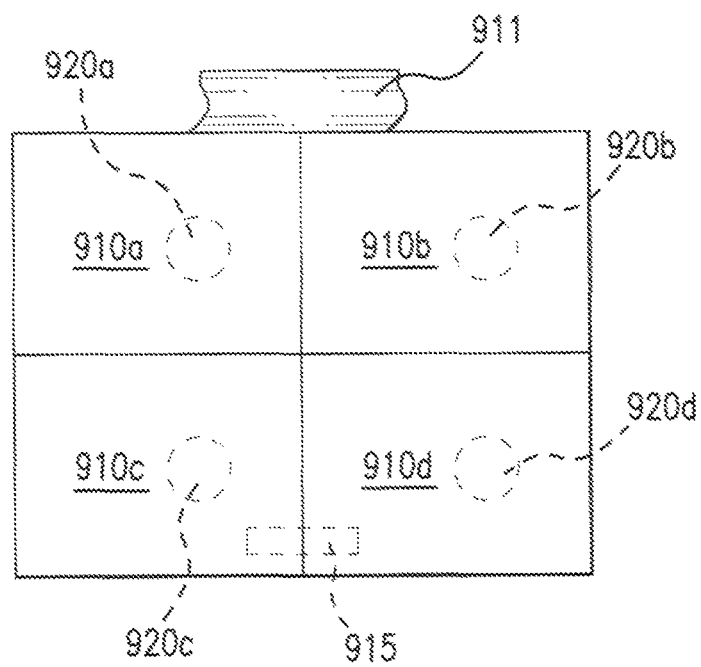

Notably, a container does not need to have integrally situated sensor compartments in order to detect and manage contained objects. As shown in alternative embodiment FIG. 9, compartment insert 910 can be inserted into container 900. Compartment insert 910 consists of compartments 910a-910d. Similar to FIG. 2, compartments 910a -910d include sensors 920a-920d, which are used to determine the presence or other attributes of objects contained within each compartment. Compartment insert 910 is configured to be secured to a container. For example, flap 911 may be used to attach compartment insert 910 to container 900. Flap 911 can be securely attached to top surface 912 of container 900. The flap is made of material that can be shaped in accordance with the object to which it is being attached. Once shaped, flap 911 is made of a material that will generally maintain its position such that the compartment insert is securely fastened to container 900. One of ordinary skill in the art would appreciate that compartment insert 911 may be secured to container 900 in any number of ways including, but not limited to, other fastening mechanisms, magnets, etc.

In this embodiment, compartment insert 910 is electrically connected to container 900. More specifically, electronic connector 915 of compartment insert 910 is connected electronic connector 905 of container 900. Electronic connector could be a USB connector or any other appropriate wired or wireless electronic connector. Compartment insert 910 is designed to relay information associated with the detection of objects contained within each compartment. Information or data from sensors 920a-920d is transmitted in the form of electronic signals that are processed by CMU 970. CMU 970 also processes data provided by GPS transponder 930 and proximity sensor 950. CMU 970, GPS transponder 930, and proximity sensor 950 are located within container 900. This embodiment allows a compartment insert to be removed for cleaning or otherwise and subsequently reused for detection and management of contained objects.

Figure 10:
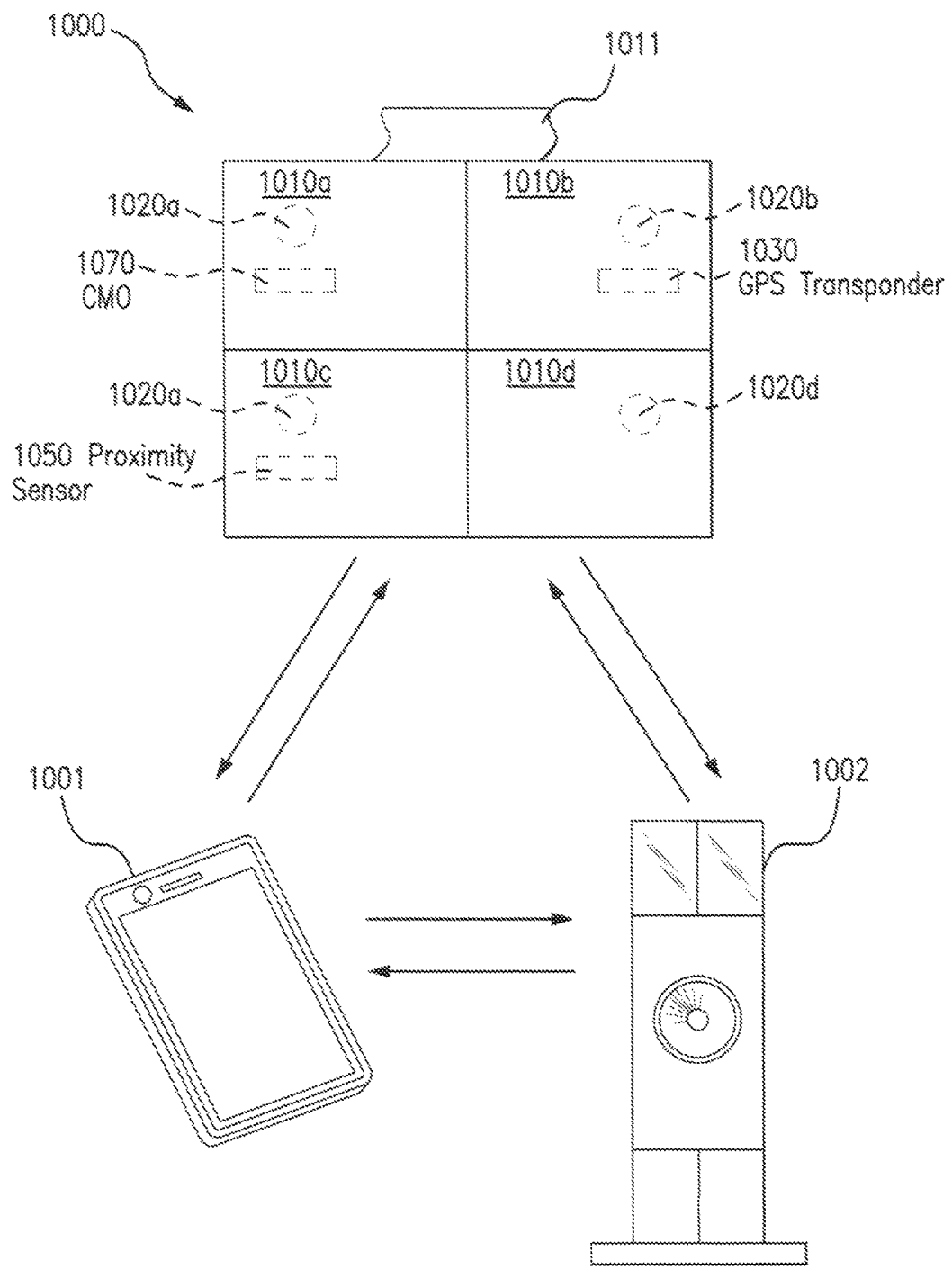
FIG. 10 is an alternative embodiment of a compartment insert according to an embodiment of the present invention.

In another alternative embodiment, a compartment insert can be designed to independently operate. As shown in FIG. 10, compartment insert 1000 is comprised of compartments 1010a-1010d and sensors 1020a-1020d. Notably, CMU 1070, which processes data from sensors 1020a-1020d, is located within compartment insert 1000. Similar to other embodiments, CMU 1070 also processes data from GPS transponder 1030 and sensor 1050, which are also located within compartment insert 1000. Flap 1011 is used to attach compartment insert 1000 to a container. Sensor 1050 is configured to independently communicate with wireless device 1001 and proximity sensor 1002. As with other embodiments, proximity sensor 1002 and wireless device 1001 can communicate with each other. Advantageously, this allows a user to utilize a compartment insert without the need to electronically connect a compartment insert to a container.

Figure 11:
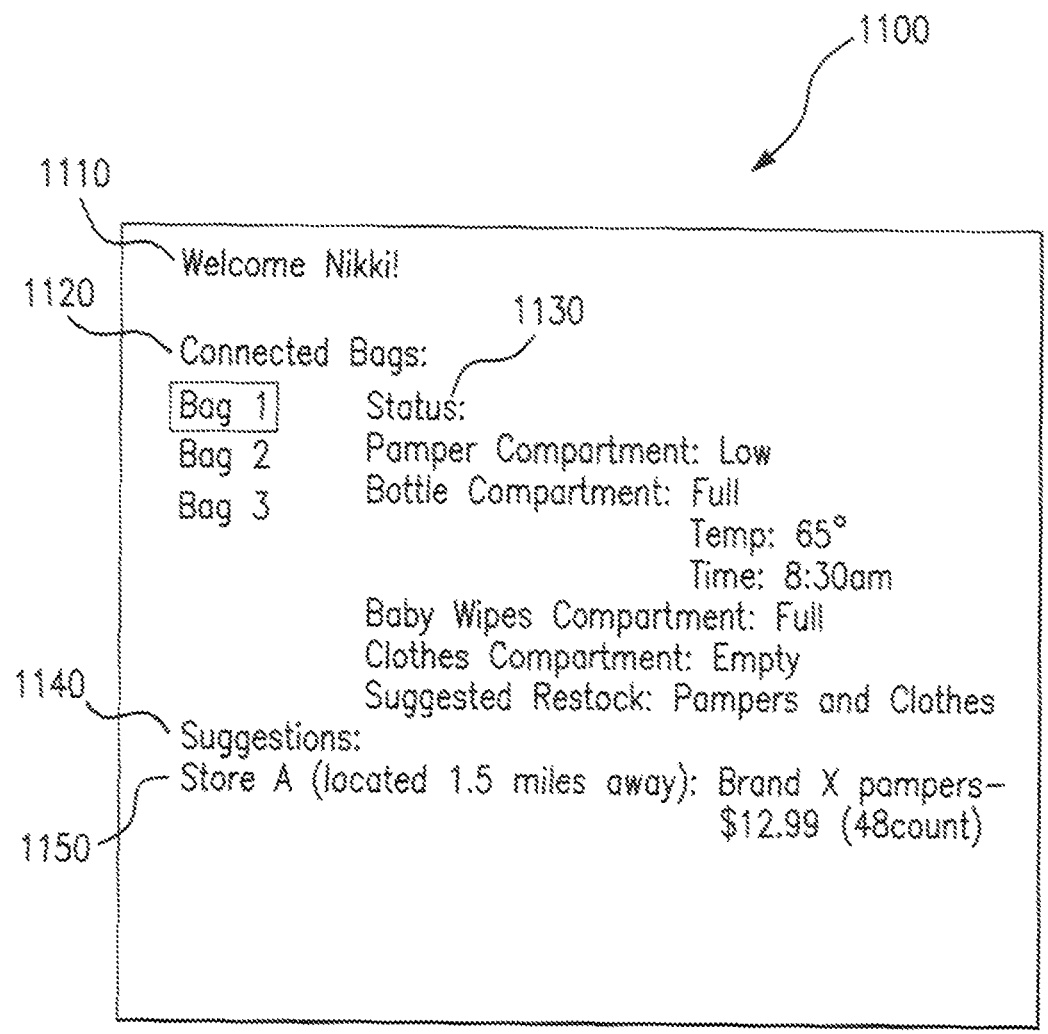
FIG. 11 is a depiction of a software graphical user interface shown on a mobile or desktop device accessing a system according to an exemplary embodiment of the present invention.

FIG. 11 is an exemplary embodiment of a software graphical user interface accessing the system via a connected mobile or desktop device. For example, GUI 1100 displays a connected user identification section 1110. Section 1120 displays each of the devices that is affiliated with the connected user. For example, three different containers are associated with the connected user. As shown, container 1 is highlighted. Therefore, all displayed status information is in relation to container 1. Section 1130 displays the status of each of the defined compartments within the selected container. Notably, a user could select each or a specific compartment(s) to query its particular status. As shown, additional information, e.g., temperature and time that object was initially detected within a compartment, may also be provided within section 1130. GUI 1100 is also configured to provide suggested restocking section 1140. Section 1140 provides information to user regarding which compartments need restocking in view of the statuses of each compartment provided in section 1130. Additionally, section 1150 may be provided to give the user additional information regarding restocking the various defined compartments. More specifically, suggestions can be provided to user regarding where items associated with certain users can be purchased. In accordance with the location of a container, the suggestions that are provided in section 1150 can be displayed according to closest location. For example, a GPS transceiver may provide the location of a container.

Figure 12:
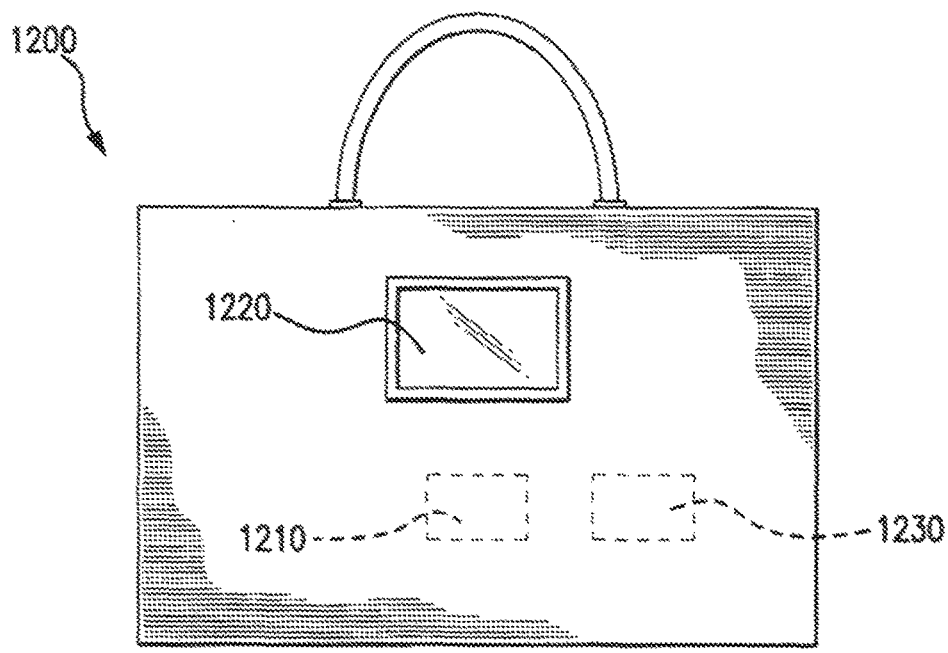
FIG. 12 is an exterior view of a container according to an embodiment of the present invention.

FIG. 12 is an exemplary embodiment of an exterior of container 1200. As shown, container 1200 includes display 1220. One of ordinary skill in the art would appreciate that display 1220 may be disposed on the exterior of container 1200. Alternatively, display 1220 may be disposed on the interior 1200a of container 1200. In a further embodiment, display 1220 may not be included with container 1200. Additionally, a global positioning module (GPS) 1210 may be embedded within container 1200. Advantageously, GPS 110 allows for tracking of the container's 1200 location.

Figure 13:
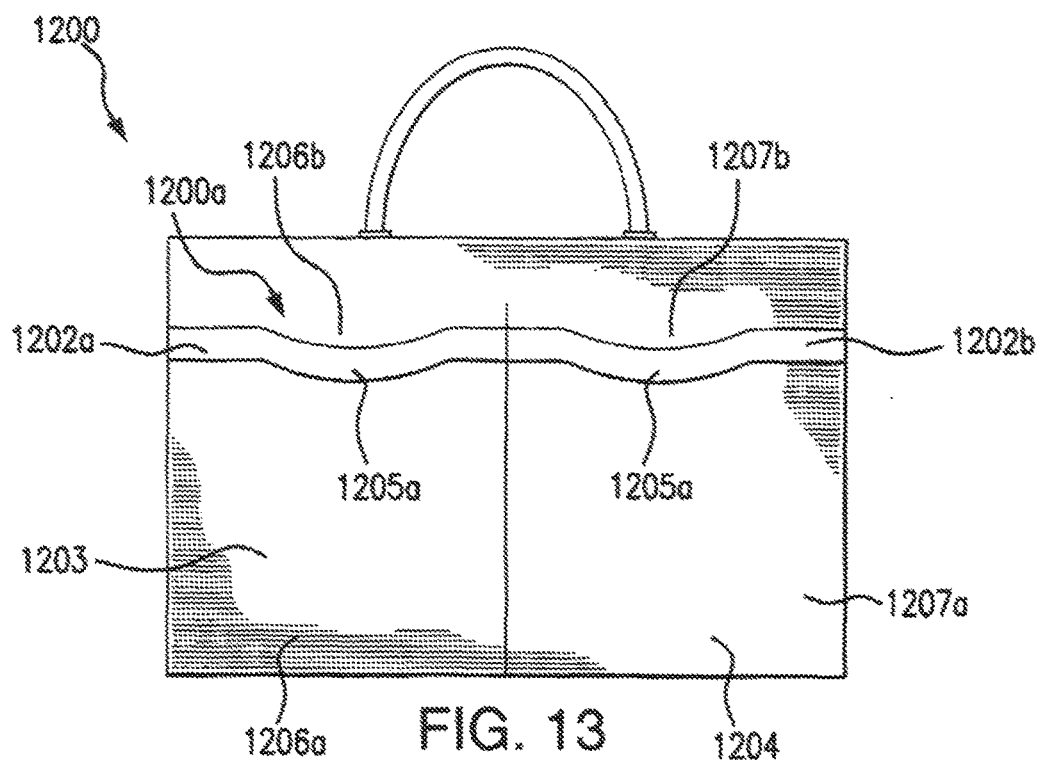
FIG. 13 is a cross sectional view of a compartment in a container according to an embodiment of the present invention.

The interior 1200a of container 1200 is shown in FIG. 13. Within interior 1200a, the container 1200 includes compartments 1203 and 1204. Compartments 1203 and 1204 includes openings 1202a and 1202b, respectively. It should be understood that openings 1202a and 1202b can embody any manner of accessing the interior of compartments 1203 and 1204. As shown, openings 1202a and 1202b includes an elasticized band that may be stretched open to access the interior of the associated compartment. One of ordinary skill in the art would immediately recognize that openings 1202a and 1202b may also include various embodiments, including but not limited to flaps, doors, or windows. Openings 1202a and 1202b include resistive band 1205a. Notably, resistive band 1205a is used to make a determination of the relative quantity of contents within the interior compartments 1203 or 1204. When compartments 1203 and 1204 are empty, openings 1202a and 1202b are in a closed position and resistive bands are in a rest or non-stretched position. In a non-limiting embodiment, resistive band 1205a, which may be electrically connected to a processor associated with container 1200, is designed to provide a specific impedance level reading based on the displacement or stretching of resistive band 1205a. Resistive band 1205a is disposed within front panel 1206a. For example, when items or contents are disposed within compartments 1203 or 1204, resistive band is stretched to allow for any items/contents to fit within either compartment 1203 or 1204. As resistive band 1202a or 1202b are displaced from its rest or unstretched position, a signal is sent to processor identifying a characteristic of the positional change of resistive band. For example, a different electrical characteristic such as impedance level may be transmitted to processor 1230 in accordance with the displacement level of the resistive band 1205a. In a non-limiting embodiment, a conductive neoprene material may be used as resistive band 1205a. Accordingly, as contents are added or removed from compartments 1203 or 1204, a different signal is transmitted to processor 1230. Processor 1230 can use the various received signals to provide up to date reading levels of content quantities of individual compartments.

Figure 14:
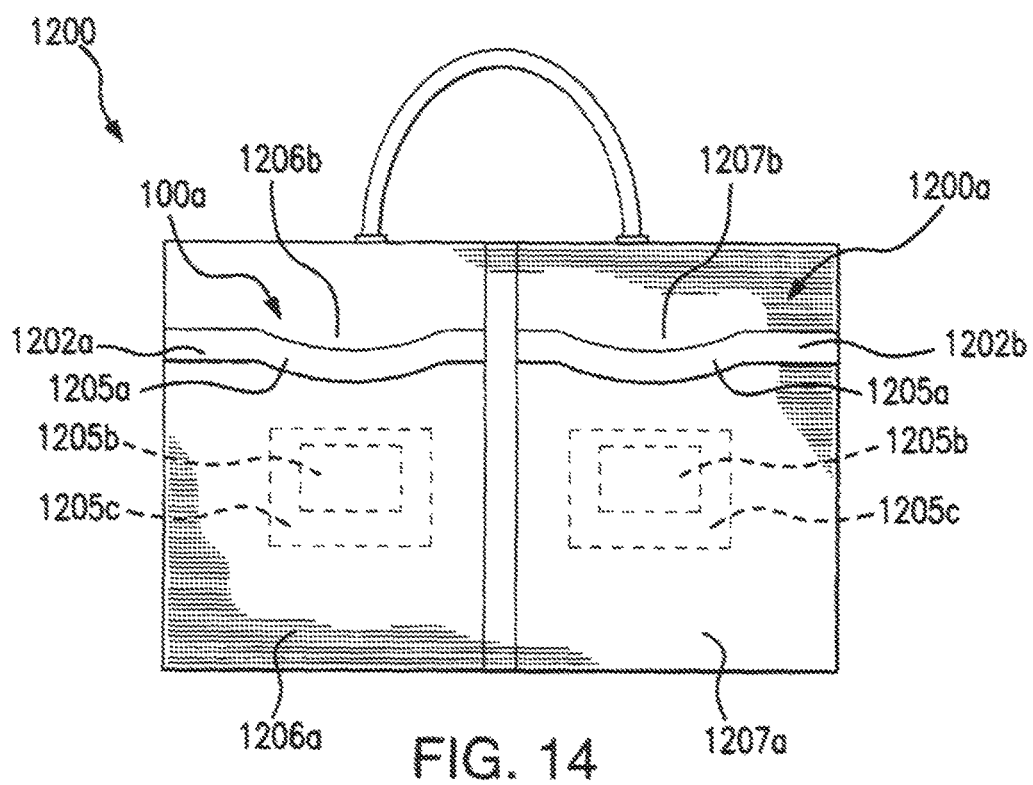
FIG. 14 is an alternative embodiment of a compartment within a container.

In an alternative embodiment, container 1200 can include a different mechanism to identify the presence of contents within a compartment. As shown in FIG. 14, a clasping mechanism may be embedded within front panel 1206a and back panel 1206b. In a non-limiting embodiment, a front magnet 1205b may be disposed within front panels 1206a and 1206b, and a back magnet 1205c may be disposed in back panels 1206b and 1207b. For example, as front magnet 1205b comes into contact with back magnet 1205c, front panel 1206a clasps shut with back panel 1206b. Front magnets 1205b and back magnets 1205c are connected to processor 1230, which allows for a determination of contents being within compartments 1203 and 1204, respectively. Accordingly, if contents are disposed within compartment 1203, front magnet 1205b will be prevented from being in contact of back magnet 1205c. An electrical signal, for example, is transmitted to processor 1230. This allows processor 1230 generate a binary reading, e.g., empty or full, of the status of contents within compartment 1206*a*.

One of ordinary skill in the art would appreciate that multiple sensing mechanisms may be used within a single compartment. Thus, as shown in FIG. 14, resistive band 1205*a* may also be incorporated into front panel 1206*a*. Advantageously, a binary or analog type of status may be transmitted to processor 1230, using magnets 1205*b* and 1205*c* or resistive band 1205*a,* respectively. Compartments 1203 or 1204 may simultaneously process analog and binary status readings transmitted to processor 1230. Alternatively, container 1200 may be enabled to switch between analog and binary mechanisms. For example, compartments 1203 or 1204 may sense the type of contents disposed within and switch between the resistive band, i.e., analog status reading, or magnetic clasp, i.e., binary status reading. In a non-limiting embodiment, hard or rigid items, would be sensed to require a binary status reading. Upon the sensing of soft or flexible items, analog status reading would be activated. Alternatively, binary or analog status reading may be manually chosen by a user.

GPS 1210 can also be used to enable status readings of the contents of compartments 1203 or 1204. For example, upon the determination that container 1200 has approached a predetermined location, resistive band 105*a* and/or magnets 1205*b*/1205*c* are enabled to determine a status reading of the amount of contents within the associated compartment. In a non-limiting embodiment, a status reading may be commenced when container 1200 is transported away from a home location, e.g., the home of a user of container 1200. If it is determined that either of the compartments 1203 or 1204 has missing or low quantity contents, processor 1230 generates an alert to the user regarding the status of each compartment. Advantageously, the interaction between processor 1230 and GPS 1210 allows for a user convenience of replenish the contents of each compartment prior to leaving his or her home location. One of ordinary skill in the art would immediately recognize that any location can be programmed within processor 1230 and gps module 1210 as a home location.

Figure 15A:
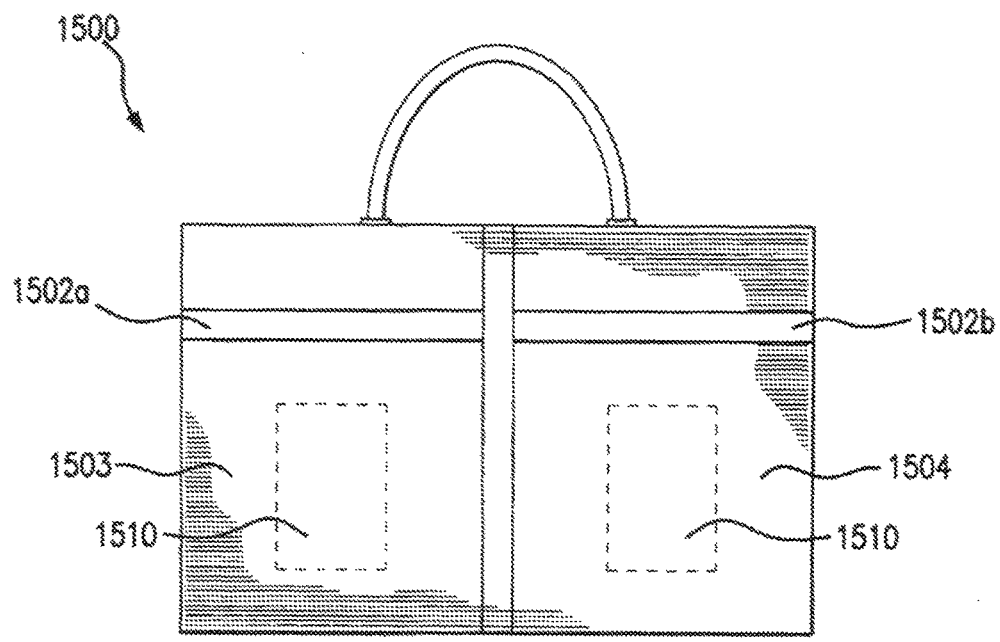
FIG. 15A is a charging port according to an embodiment of the present invention.

Wireless charging of mobile devices is an aspect of an embodiment of the present invention. FIG. 15A demonstrates embedded charging port 1510 within a front or back panel of compartment 1503 or 1504. Compartment 1503 and 1504 are accessed via opening 1502*a* and 1502*b,* respectively. A mobile device may be disposed within compartment 1503 or 1504. Upon charging port 1510 sensing the presence of an appropriately enabled wireless device, the wireless charger 1510 commences to charge the battery of the wireless device. Charging port 1510 may operate according to any of the wireless charging standards, including but not limited to Qi or Rezence. One of ordinary skill in the art would immediately appreciate that other wireless charging standards may be implemented within charging port 1510.

Figure 15B:
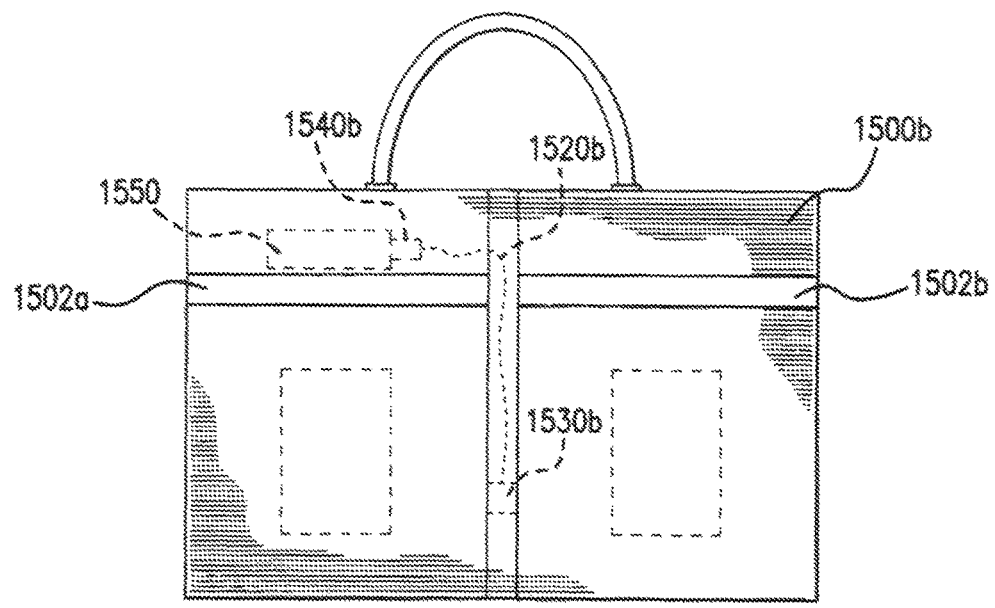
FIG. 15B is an alternative embodiment of a charging port according to an embodiment of the present invention.

In alternative embodiment FIG. 15B, a wired charging solution is implemented within container 1500B. For example, a wired charging device 1520*b* is used to replenish the battery charge of mobile device 1550. As shown, wired charging device may be connected to a power source within container 1500*b* via internal port 1530*b*. Internal port 1530*b* may include, but is not limited to, a Universal Serial Bus (USB) connector. External port 1540*b* connects to wireless device 1540. External port 1540*b* may include, but is not limited to micro USB or a lightning port connection.

Figure 16:
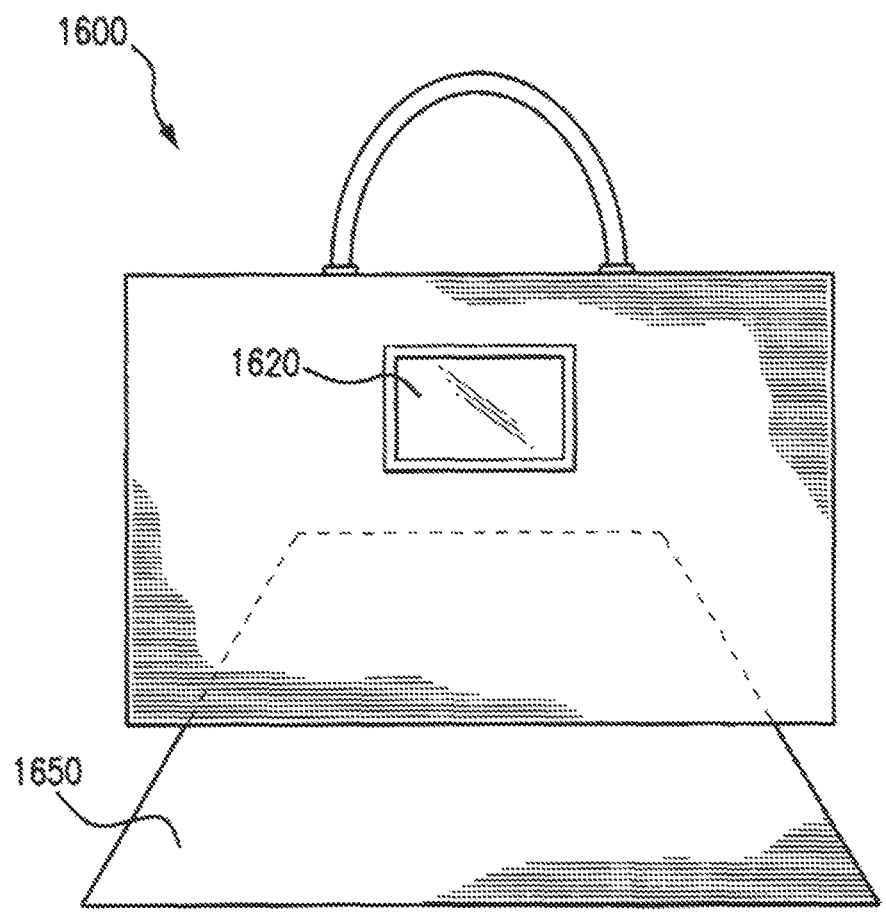
FIG. 16 is an embodiment of a wireless charging device.
Figure 17A:
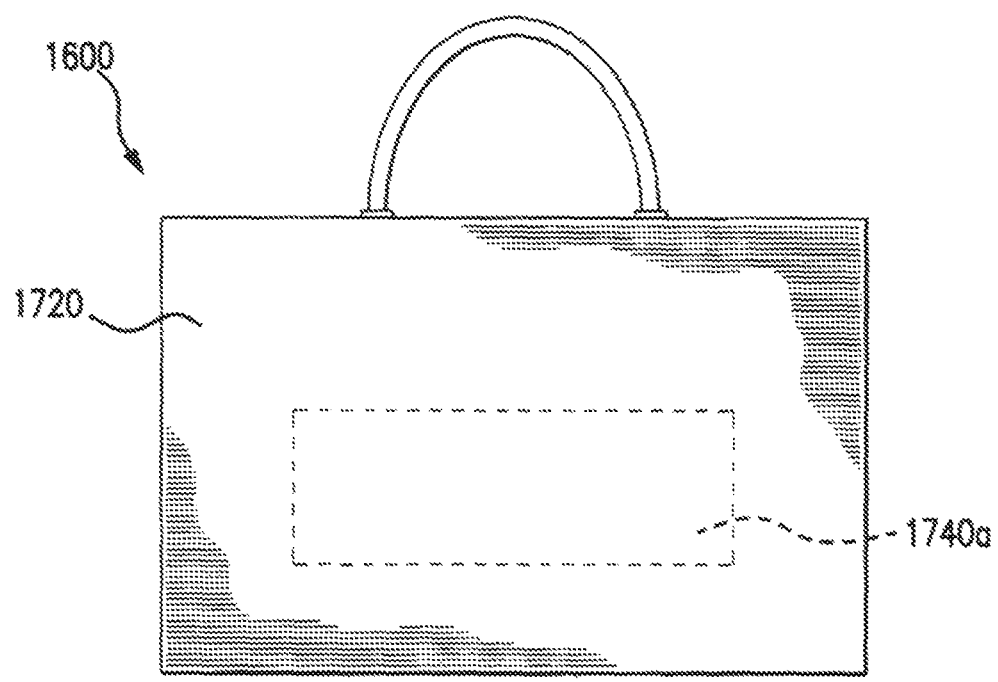
FIG. 17A is an embodiment of a rechargeable battery according to the present invention.
Figure 18:
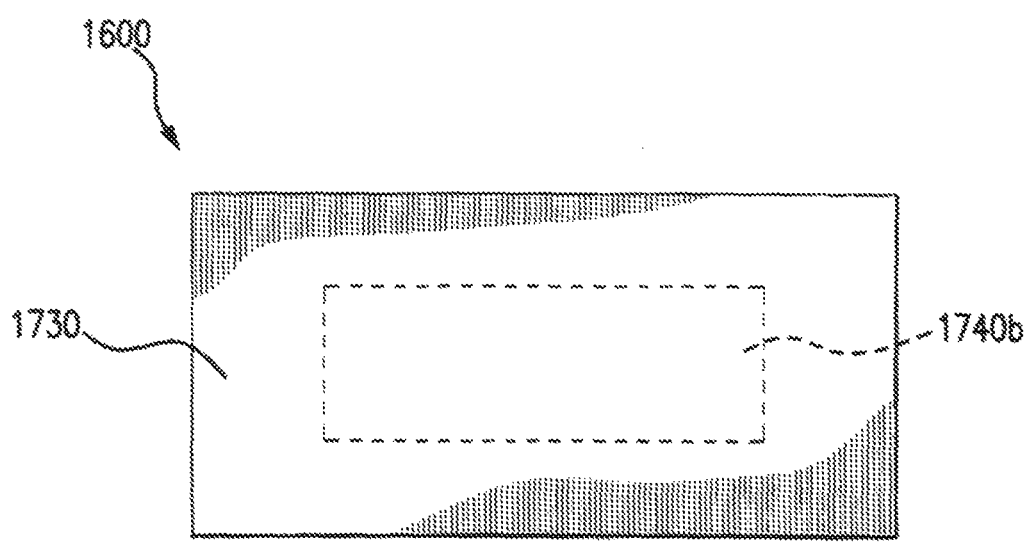
FIG. 18 is an alternative embodiment of a rechargeable battery.
Figure 19:
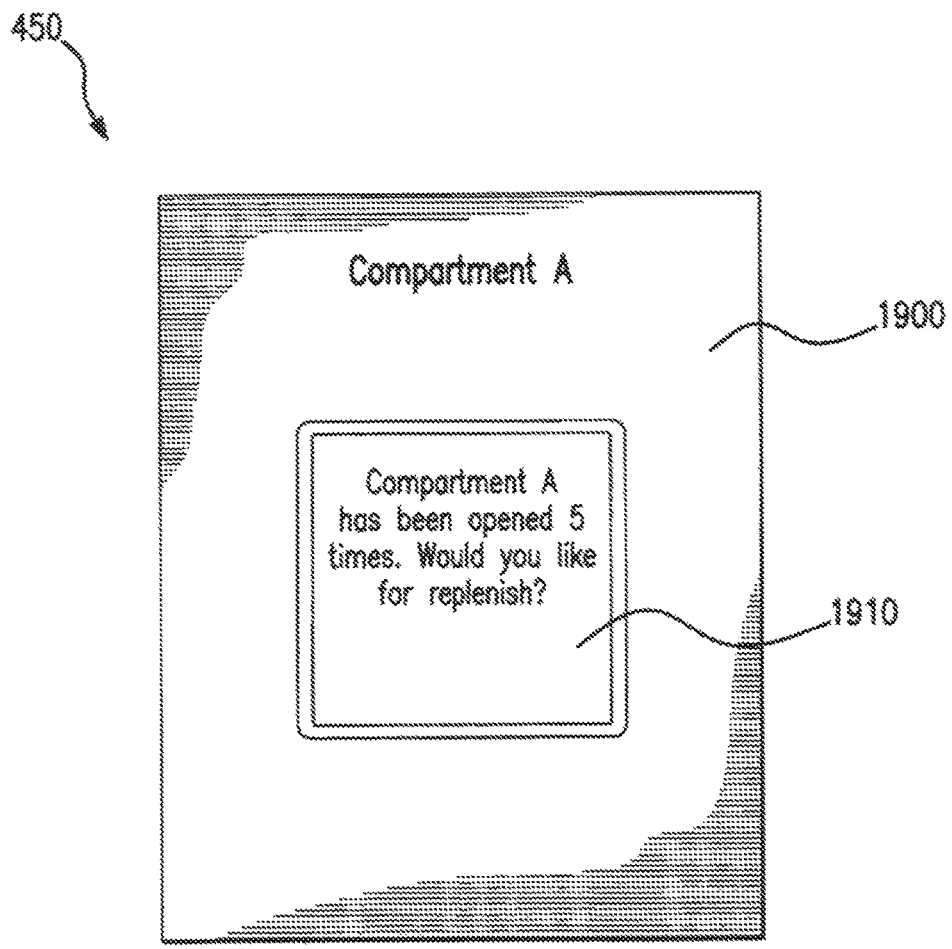
FIG. 19 is an embodiment of a graphical user interface according to the present invention.

As described, several of the components within the container require electrical power in order to operate. For example, external display 1220 could include an LCD panel display, which requires an electrical power to function. As shown in FIG. 16, a wireless charging device 1650 can be used to charge a power source within container 1600. It should be understood that the power source could be used to operate external display 1620, electrically coupled resistive bands, electrically coupled magnetic clasps, processor, etc. As shown in FIG. 17A, the power source for container may be an embedded rechargeable battery. For example, the rechargeable battery 1740*a* may be disposed on a side portion 1720 of container 1600. Alternatively, rechargeable battery 1740*b* may be disposed on a bottom portion 1730 of container 1600. Disposing the rechargeable battery within different locations of container 1600 may provide for a more useful weight distribution for allowing upright positioning of container 1600. This may be particularly useful when disposing container 1600 on wireless charging device 1650. Rechargeable battery may include, but is not limited to, a lithium ion type battery. Additionally, rechargeable battery 1740*a* or 1740*b* may be a flexible lithium ion battery. Advantageously, this allows for less overall weight of container 1600, as well as less rigidity of container for easier transport.

In a non-limiting embodiment, information related to the status of each compartment within a container is transmitted to a user device. For example, a user could launch software on his or her smartphone device displaying the status of each individual compartment. As shown, wireless device 450 is depicting screen 1900, which displays messages regarding the status of a compartment within a container. Message 1910 is displayed to convey the number of times that a particular compartment has been accessed or opened. As shown, message 1910 prompts the user for input regarding the need to replenish items within the associated compartment. Notably, this allows for management of contents that may be difficult to dispose directly within a compartment. For example, wet items such as diaper wipes, wet wipes, water bottle, etc., which may damage the interior of a container, may be stored directly in a rigid container. The rigid container may in turn be disposed within a compartment of container 1200. Given the rigid nature of the container housing the wet items, a binary status reading utilizing magnets 1205*b* and 1205*c* may be enabled. Advantageously, a user can manage the status of the interior wet items by determining the number of times the associated compartment has been accessed.

Figure 20:
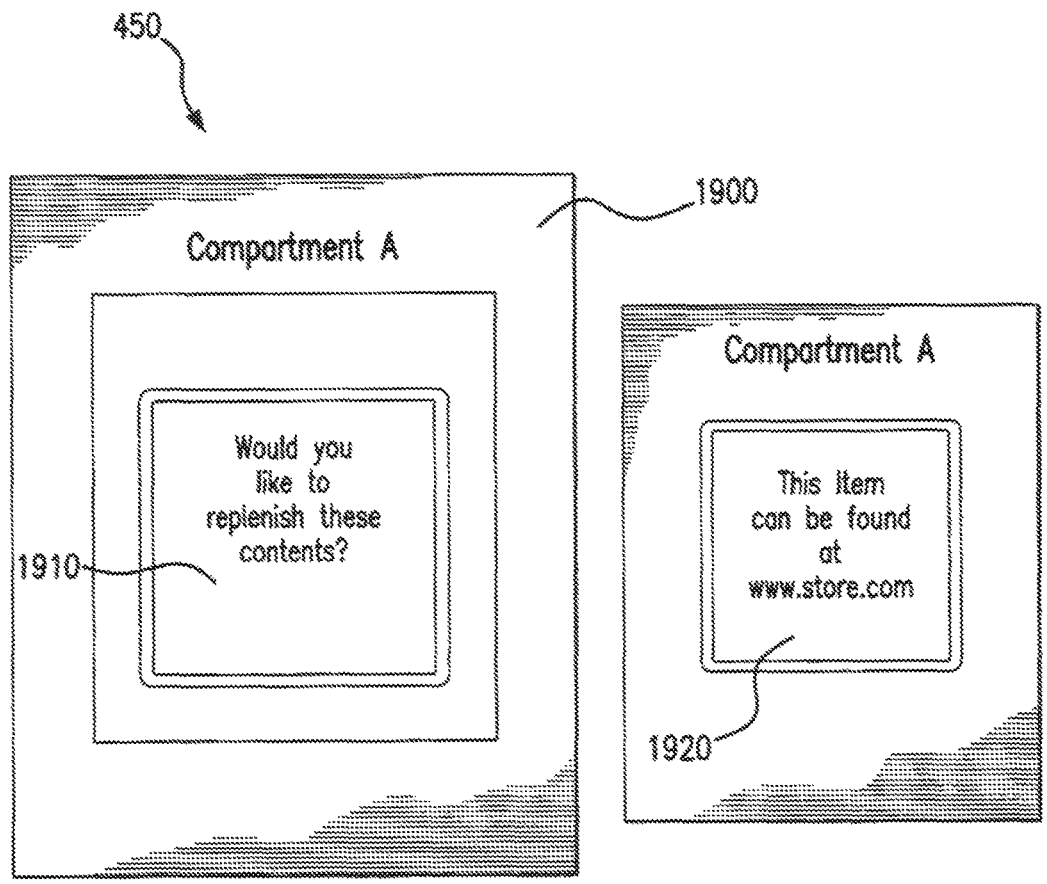
FIG. 20 is an alternative embodiment of a graphical user interface according to the present invention.

FIG. 20 depicts a non-limiting follow-on screen 1920 to screen 1910. For example, if user chooses that he or she would like to replenish the contents of the identified compartment, screen 1920 is displayed to provide additional information about the contents. As shown, a link to a retail store that sells the item that needs replenishment may be displayed. The link may be displayed according to user preferences or geographic location of wireless device 450 or the associated container 1200. Furthermore, screen 1920 may be displayed in accordance with a business agreement with various retailers.

Figure 21:
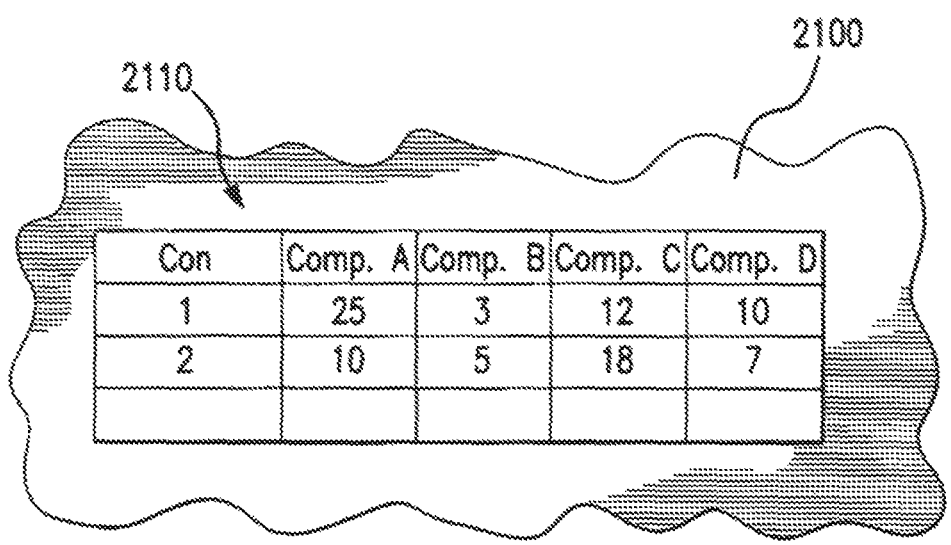
FIG. 21 is an embodiment of the present invention depicting a cloud based storage system.

FIG. 21 depicts a cloud based storage system 2100. System 2100 includes database 2110 that aggregates data of various containers. As shown, containers 1 and 2 include multiple compartments. Database 2110 is configured to receive data regarding the number of times each compartment within a container has been accessed within a predetermined timeframe. A particular item may be associated with a specific compartment, which is stored within database 2110. This beneficially provides information regarding the recurring use of products. Information from containers 1 and 2 may be transmitted to database wirelessly or otherwise.

For example, data may be transmitted via cellular connection, WiFi, Ethernet, etc. This data may be aggregated in real time, i.e., each time that a compartment is accessed, or may be transmitted a predetermined time.

The above-described features may be implemented in combination with each other to provide various exemplary embodiments in accordance with the invention.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A compartment insert comprising:
   a. at least one compartment that can contain at least one object;
   b. a transceiver configured to:
      i. receive a first signal causing a determination of the presence of at least one object within the at least one compartment; and
      ii. transmit a second signal regarding the determination of the presence of at least one object within the at least one compartment, such that the determination occurs based on the location of the compartment insert.

2. The compartment insert according to claim 1, wherein the at least one compartment has at least one sensor configured determine whether an object is present within the at least one container.

3. The compartment insert according to claim 2, wherein the at least one sensor is at least one of light, infrared, weight, magnetic interaction, and induction.

4. The compartment insert according to claim 1 further comprising a central management unit including a computer processing unit and at least one memory unit.

5. The compartment insert according to claim 4 further comprising a proximity sensor that transmits a signal to determine whether at least one object is within the at least one compartment.

6. The compartment insert according to claim 5, wherein the proximity sensor at least one of transmits and receives a signal when in range of a separate proximity sensor external to the compartment insert.

7. The compartment insert according to claim 4 further comprising a global positioning signal unit configured to transmit the location of the compartment insert.

8. The compartment insert according to claim 1 further comprising a flap that can engage a separate container.

9. A method of determining the presence of at least one object within a container comprising:
   a. providing at least one compartment that is disposed within the container;
   b. disposing at least one sensor within the at least one compartment;
   c. receiving, by the container, a first signal causing the at least one sensor to determine whether at least one object is present within the at least one compartment, wherein the first signal occurs in relation to at least one predetermined location of the container; and
   d. transmitting a second signal regarding the determination of the presence of at least one object in the at least one compartment.

10. A method according to claim 9, further comprising transmitting a signal relating to an attribute of the at least one object when its presence is determined in the at least one compartment.

11. A method according to claim 10, further comprising transmitting a signal relating to an attribute of the at least one compartment.

12. A container comprising:
   at least one compartment;
   an opening within the compartment, wherein the opening includes a mechanism;
   a processor configured to receive a signal from the mechanism; and
   a location tracking device adapted to cause the mechanism to determine at least one of the presence and the quantity of an object within the compartment, such that the determination occurs in relation to at least one predetermined location of the container.

13. A container according to claim 12, wherein the location tracking device comprises a global positioning device.

* * * * *